United States Patent
Klym et al.

(10) Patent No.: US 11,228,871 B2
(45) Date of Patent: Jan. 18, 2022

(54) COMMUNICATION APPARATUS CONFIGURED TO MANAGE USER IDENTIFICATION QUERIES AND RENDER USER IDENTIFICATION INTERFACES WITHIN A GROUP-BASED COMMUNICATION SYSTEM

(71) Applicant: SLACK TECHNOLOGIES, INC., San Francisco, CA (US)

(72) Inventors: Jason Klym, San Francisco, CA (US); Venkatraju Venkatanaranappa, Palo Alto, CA (US); Michael Demmer, San Francisco, CA (US)

(73) Assignee: Slack Technologies, Inc., San Francisco, CA (US)

( * ) Notice: Subject to any disclaimer, the term of this patent is extended or adjusted under 35 U.S.C. 154(b) by 95 days.

(21) Appl. No.: 16/778,723

(22) Filed: Jan. 31, 2020

(65) Prior Publication Data
US 2021/0243570 A1    Aug. 5, 2021

(51) Int. Cl.
*G06F 15/173* (2006.01)
*H04W 4/08* (2009.01)
(Continued)

(52) U.S. Cl.
CPC ........... *H04W 4/08* (2013.01); *H04L 12/1859* (2013.01); *H04L 12/1863* (2013.01); *H04L 67/2842* (2013.01)

(58) Field of Classification Search
CPC .. H04W 4/08; H04L 12/1859; H04L 12/1863; H04L 67/2842
See application file for complete search history.

(56) References Cited

U.S. PATENT DOCUMENTS 6,606,744 B1 * 8/2003 Mikurak ................. H04L 29/06
717/174
6,671,818 B1 * 12/2003 Mikurak ................ G06Q 10/06
714/4.21

(Continued)

OTHER PUBLICATIONS

"Die, Email, Die! A Flickr Cofounder Aims To Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 2 pages.

(Continued)

*Primary Examiner* — Thanh T Nguyen
(74) *Attorney, Agent, or Firm* — Lee & Hayes, P.C.

(57) ABSTRACT

Various embodiments of the present invention are directed to a communications apparatus and associated methods configured for managing user identification queries. The communication apparatus is configured to receive a user identification query comprising a requesting user identifier and a target user identifier, compare the target user identifier to a user status cache associated with the requesting user identifier to determine a known status, an unknown status, or a pending status, and cause rendering of a known user identification interface or a limited user identification interface. In some embodiments, the communication apparatus is configured to transmit a client device hold instruction in response to determining the pending status for the target user identifier with respective to a given requesting user identifier. Various embodiments discussed herein mediate and resolve voluminous user identification queries through a specially configured group-based caching service and associated system architecture.

23 Claims, 32 Drawing Sheets

(51) Int. Cl.
*H04L 12/18* (2006.01)
*H04L 29/08* (2006.01)

(56) References Cited

U.S. PATENT DOCUMENTS

| | | | | |
|---|---|---|---|---|
| 7,124,101 | B1 * | 10/2006 | Mikurak | G06Q 10/06 |
| | | | | 705/35 |
| 7,716,077 | B1 * | 5/2010 | Mikurak | G06Q 10/06 |
| | | | | 705/7.12 |
| 8,032,409 | B1 * | 10/2011 | Mikurak | G06Q 30/00 |
| | | | | 705/14.39 |
| 9,846,859 | B1 * | 12/2017 | Casale | G06F 16/24578 |
| 2004/0064351 | A1 * | 4/2004 | Mikurak | G06Q 10/087 |
| | | | | 705/22 |
| 2005/0160155 | A1 | 7/2005 | Geekee et al. | |
| 2006/0178918 | A1 * | 8/2006 | Mikurak | G06Q 10/06375 |
| | | | | 705/7.25 |
| 2012/0069131 | A1 * | 3/2012 | Abelow | G06Q 10/067 |
| | | | | 348/14.01 |
| 2014/0359709 | A1 * | 12/2014 | Nassar | H04L 65/1083 |
| | | | | 726/4 |
| 2018/0287982 | A1 | 10/2018 | Draeger et al. | |
| 2019/0190863 | A1 | 6/2019 | Baker et al. | |
| 2020/0322347 | A1 * | 10/2020 | Goyal | H04L 63/102 |

OTHER PUBLICATIONS

"How Slack changed the way we work by putting the customer experience first", Repeat Customer Podcast, Episode 3, [online][retrieved May 9, 2019], Retrieved from the Internet: <URL: https://www.zendesk.com/resources/slack-customer-experience/, (2019) 13 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.

David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.

Ernie Smith, "Picking Up The Slack", Tedium, [online][retrieved May 9, 2019], Retrieved from the Internet: <URL: https://tedium.co/2017/10/17/irc-vs-slack-chat-history/>. (dated Oct. 17, 2017) 8 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 17 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.

Matsumoto, T. et al., "Chocoa Communicator—A New Communication System Based on Awareness and Text Communications-", Fujitsu Sci. Tech. J., 36, 2, (Dec. 2000) 154-161.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 2 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 66 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 2 pages.

Robert Hof, "Stewart Butterfield On How Slack Became a $2.8 Billion Unicorn", Forbes, [online][retrieved May 9, 2019], Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

The PCT Search Report and Written Opinion dated Apr. 30, 2021 for PCT application No. PCT/US21/14664, 14 pages.

* cited by examiner

400 cause rendering of a known user identification interface to the group-based communication interface in response to determining the known status for the target user identifier 402

FIG. 4A

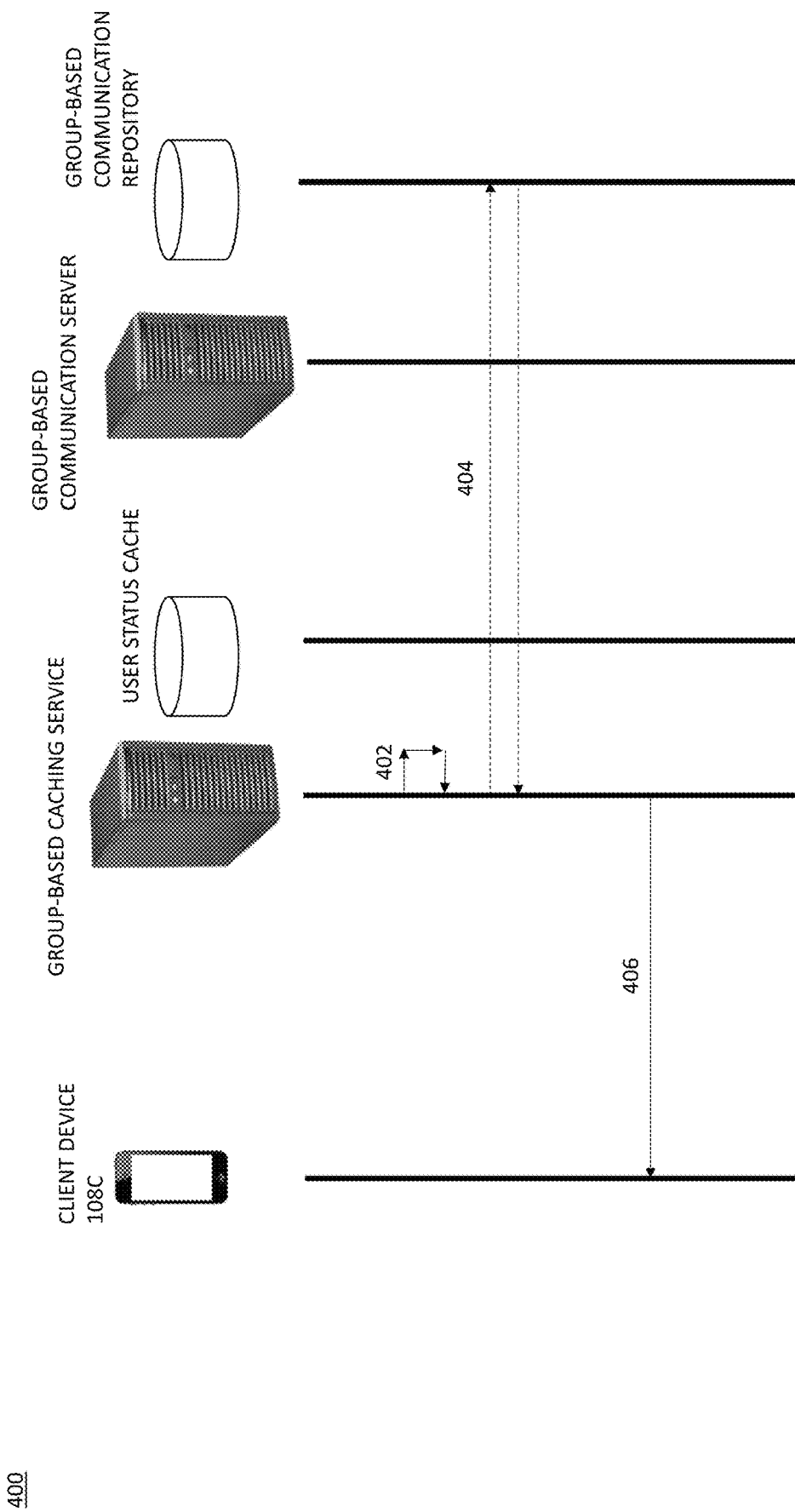

500 cause rendering of a limited user identification interface to the group-based communication interface in response to determining the unknown status for the target user identifier 502

FIG. 5A cause transmission of a client device hold instruction in response to determining the pending status for the target user identifier 602

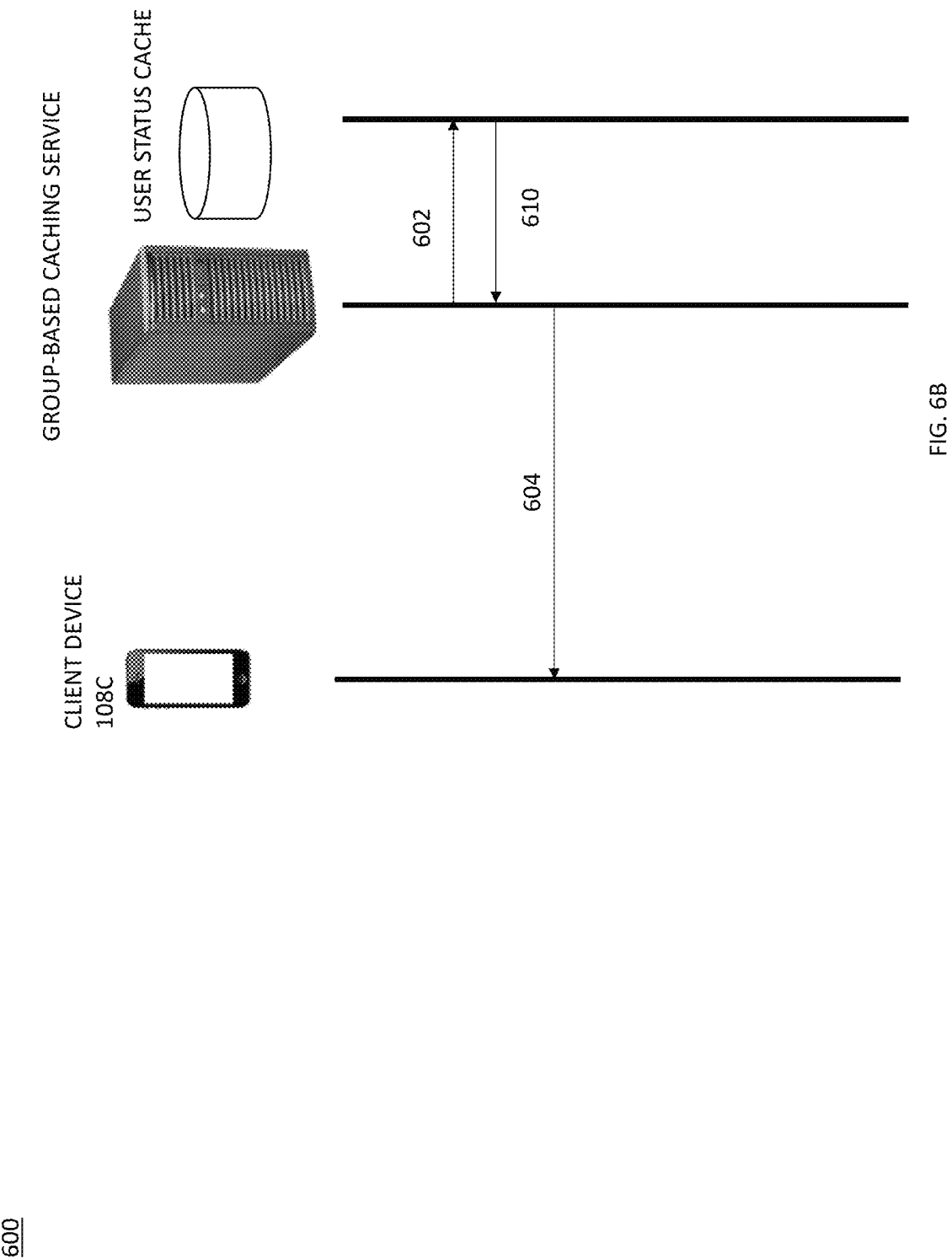

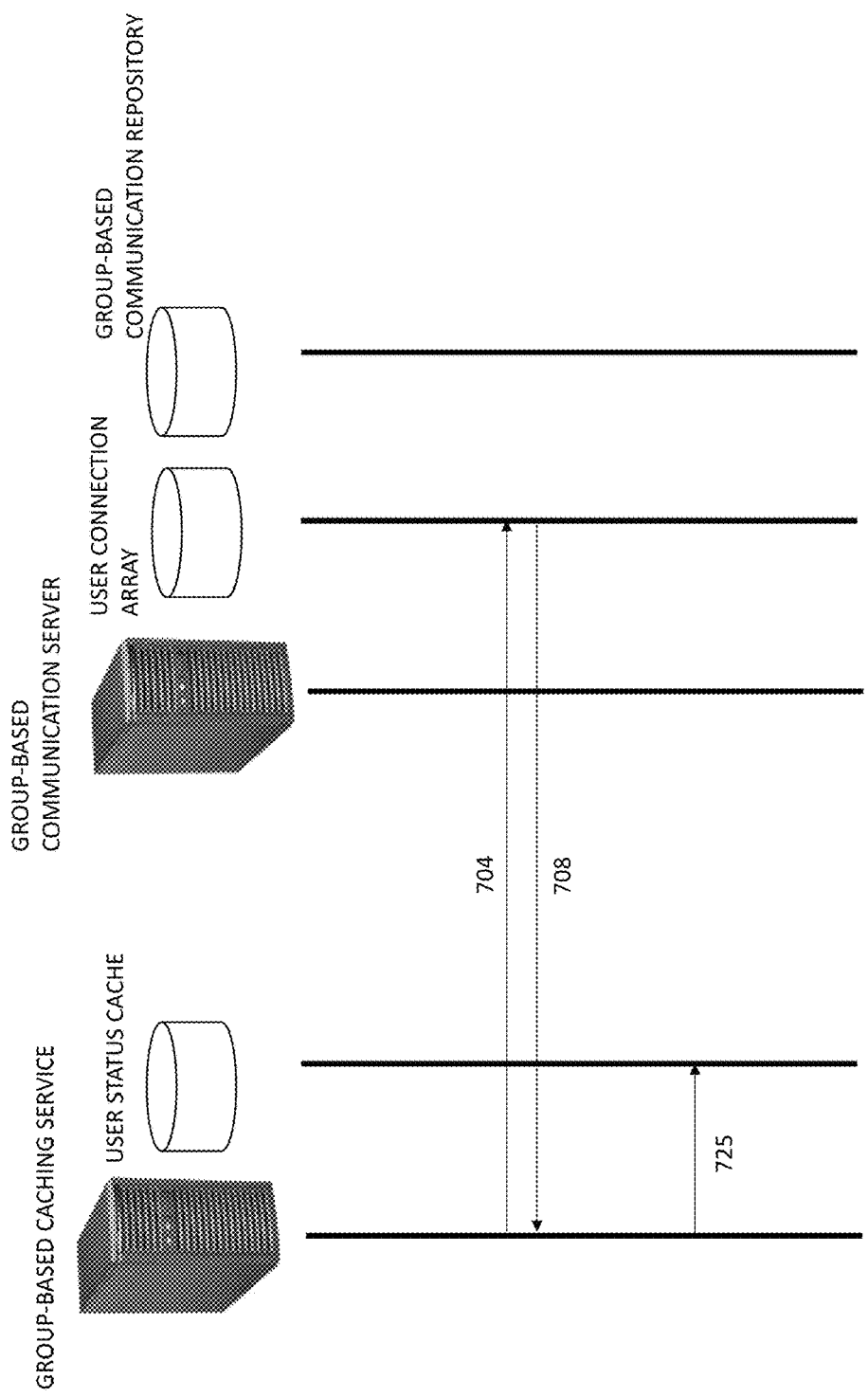

800 cause rendering of a known user identification interface to the group-based communication interface in response to determining the resolved known status for the target user identifier 802

900 cause rendering of a limited user identification interface to the group-based communication interface in response to determining the resolved unknown status for the target user identifier

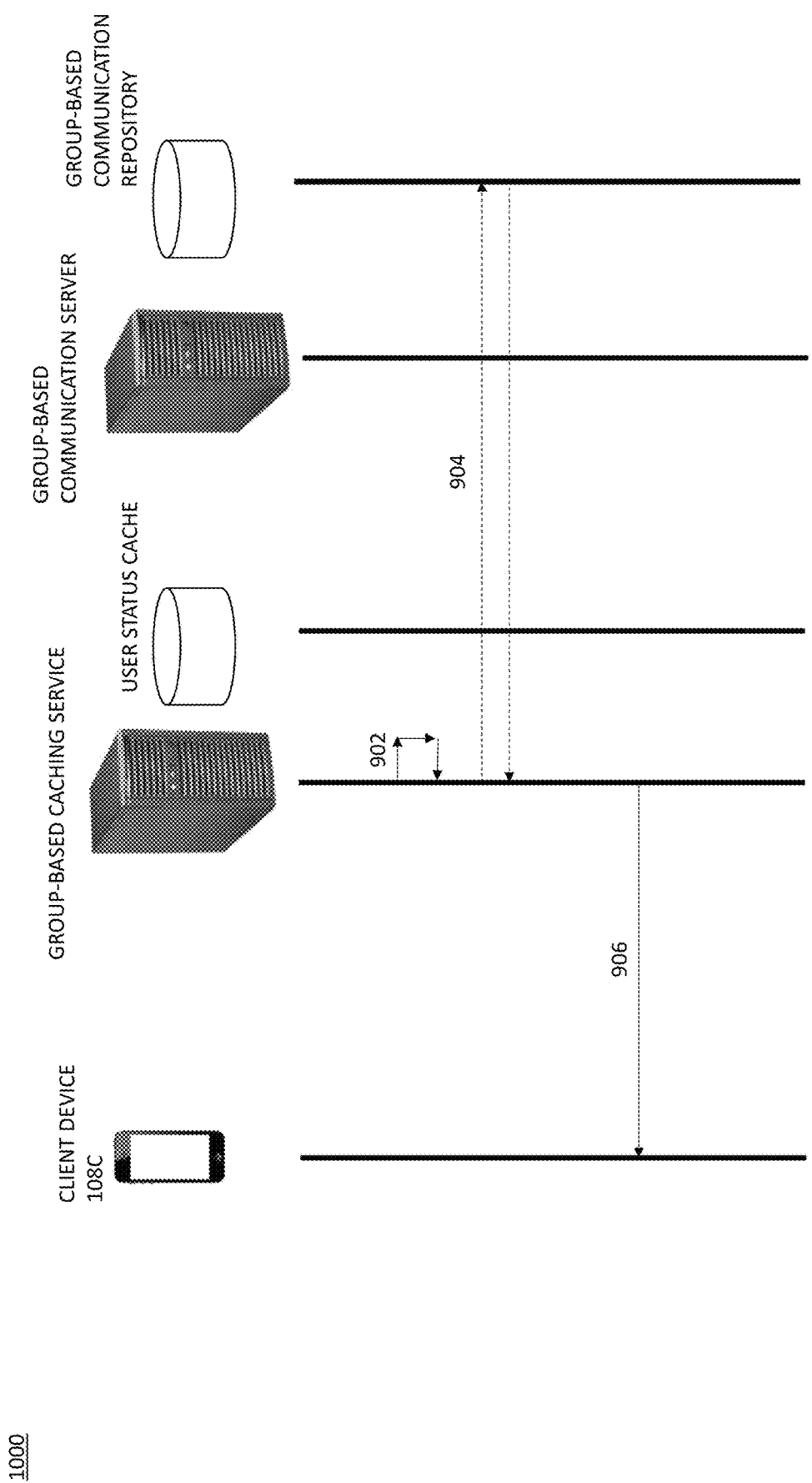

1000 cause retrieval of a limited user identification object associated with the target user identifier from a group-based communication repository in response to determining the resolved unknown status for the target user identifier and following transmission of the client hold instruction 1004 transmit the limited user dentification object to the client device for rendering, via a display of the client device, the limited user identification interface to the group-based communication interface based on the limited user identification object 1006

FIG. 10A

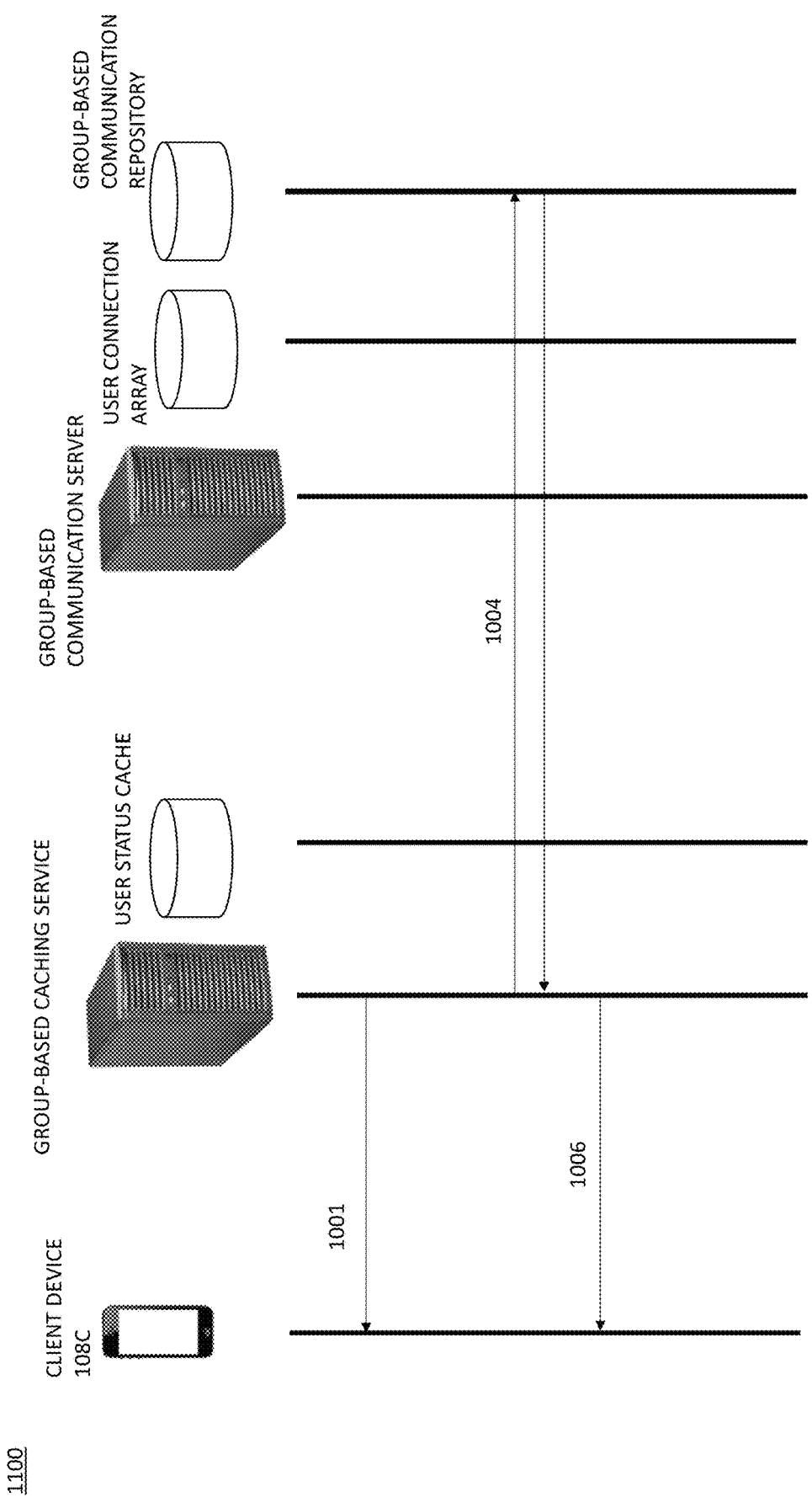

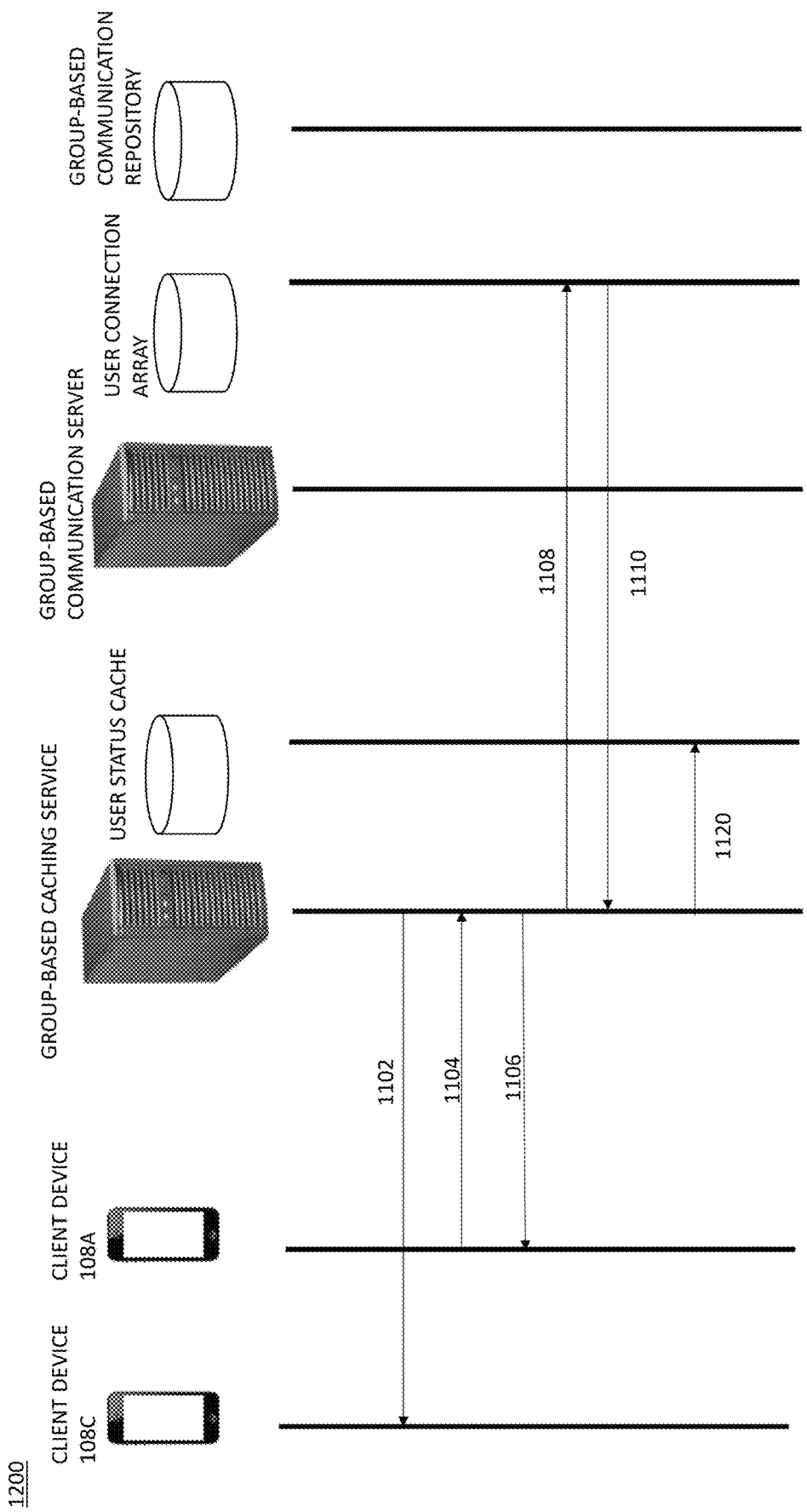

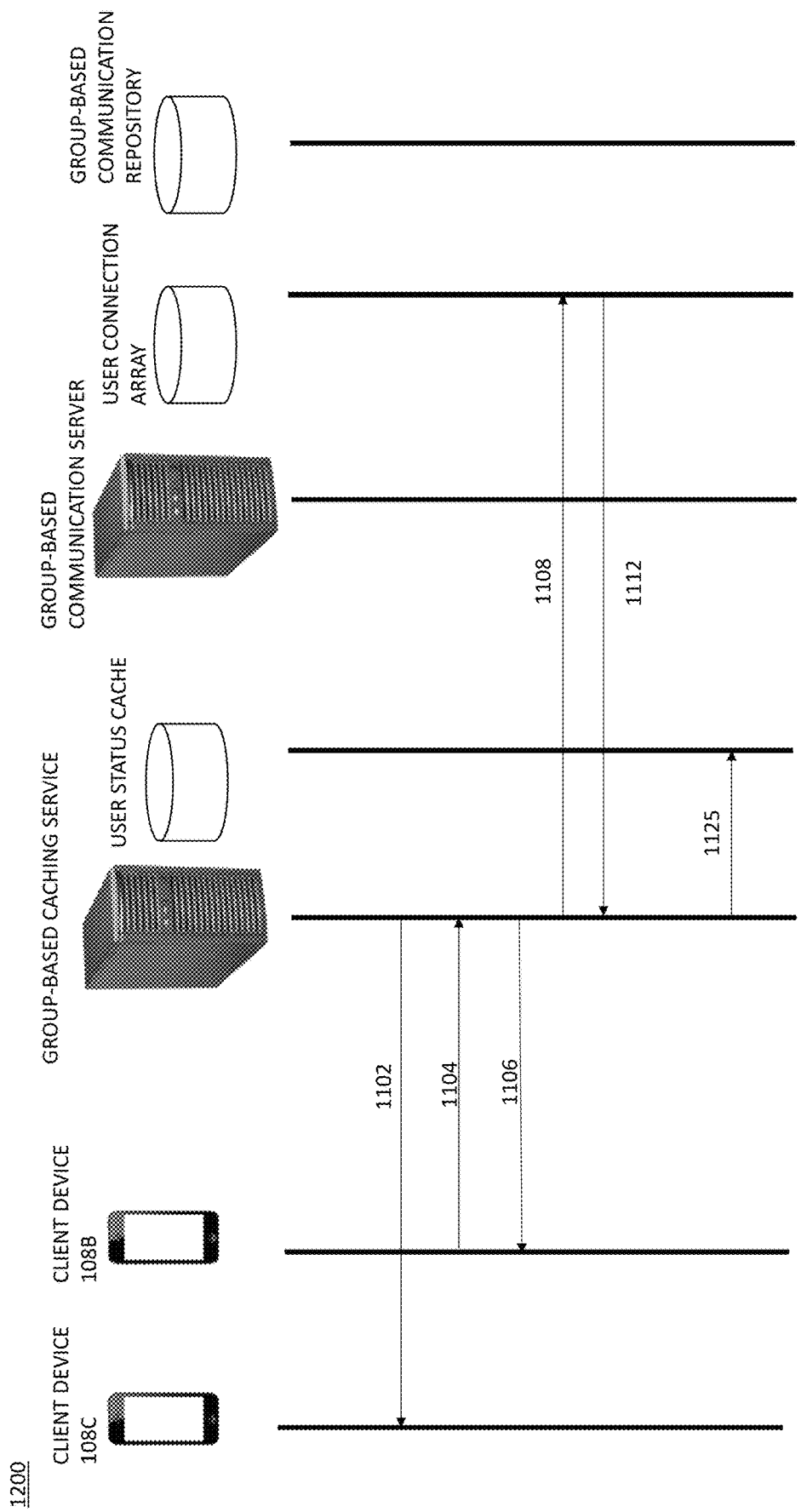

COMMUNICATION APPARATUS CONFIGURED TO MANAGE USER IDENTIFICATION QUERIES AND RENDER USER IDENTIFICATION INTERFACES WITHIN A GROUP-BASED COMMUNICATION SYSTEM

BACKGROUND

Various communication systems facilitate messaging communications and collaboration among a plurality of users across client devices connected with a group-based communication system. Applicant has identified a number of deficiencies and problems associated with such conventional communication systems. Through applied effort, ingenuity, and innovation, these deficiencies and problems have been solved by developing solutions that are structured in accordance with the embodiments of the present invention, many examples of which are described in detail herein.

BRIEF SUMMARY

Various embodiments of the present disclosure are directed to a highly scalable communications apparatus and method of operating the same, wherein the privacy of users in a group-based communication system may be efficiently managed while reducing the network resource load on a group-based communication server. According to embodiments, a user identification module of a group-based caching service manages user identification queries issued from client devices operating within a group-based communication network architecture.

As discussed in greater detailed below, group-based caching services are configured to cache group-based communication system data that is required for requesting client devices to render one or more graphic user identification interfaces to a group-based communication interface. Such graphic user identification interfaces require user profile data to identify and contextualize other users that are collaborating and communicating with an operating user within the group-based communication interface.

In various embodiments, a user identification module of the group-based caching service retrieves a user identification query from a client device and determines the system status associated with the relationship (or connection) between an operating or requesting user and a targeted user as discussed in detail below. The group-based caching service then provides an appropriate response to the requesting client device according to the retrieved and cached user status data. For example, the group-based caching service causes the requesting client device to render a known user identification interface to the group-based communication interface for a target user with a known status. Alternatively, the group-based caching service causes the requesting client device to render a limited user identification interface to the group-based communication interface for a target user with an unknown status. The group-based caching service causes the requesting client device to hold for resolution of a pending status, obviating the need for the client device to call back to a group-based communication server. Such actions limit undue traffic between client devices and the group-based communication server.

In various embodiments, a user identification module of the group-based caching service retrieves a user identification query from a client device and subsequently retrieves a second user identification query for the target user from a second client device. In this example, the two user identification queries have different requesting user identifiers but share a common target user identifier. The group-based caching service transmits a client mute instruction to each client device causing the requesting client devices to hold for resolution of a pending status. The user identification module of the group-based caching service queries the group-based communication server to determine the system statuses for the target identifier on behalf of each client device. Such action further limits undue group-based communication server traffic as discussed in greater detail below.

Various embodiments of the present disclosure are directed to methods and apparatuses for managing user identification queries. In embodiments, the apparatuses comprise a processor and a memory storing instructions executable by the processor to cause the apparatus to perform various functions. In embodiments, those functions comprise retrieving a user identification query associated with a group-based communication interface. The user identification query includes, inter alia, a requesting user identifier and a target user identifier.

The apparatus is further configured to compare the target user identifier to a user status cache associated with the requesting user identifier to determine one of a known status, an unknown status, or a pending status for the target user identifier. The apparatus is then configured to cause rendering of a known user identification interface to the group-based communication interface in response to determining the known status for the target user identifier. Alternatively, the apparatus is configured to cause rendering of a limited user identification interface to the group-based communication interface in response to determining the unknown status for the target user identifier.

In embodiments in which a pending status is identified instead of the known status or the unknown status, the apparatus is configured to cause transmission of a client device hold instruction to a requesting client device. The apparatus is then configured to cause comparison of the target user identifier to a group connection array associated with the requesting user identifier to determine a resolved known status or a resolved unknown status in response to determining the pending status for the target user identifier.

Various embodiments involve the apparatus being further configured to cause updating of the user status cache associated with the requesting user identifier to replace the pending status for the target user identifier with the determined resolved known status or the resolved unknown status.

In some embodiments, the apparatus is configured to cause rendering of the known user identification interface to the group-based communication interface in response to determining the resolved known status for the target user identifier. In other embodiments, the apparatus is configured to cause rendering of the limited user identification interface to the group-based communication interface in response to determining the resolved unknown status for the target user identifier.

In some embodiments, the apparatus is configured to cause retrieval of a limited user identification object associated with the target user identifier. In such embodiments, the limited user object is retrieved from a group-based communication repository in response to determining the unknown status for the target user identifier. The apparatus is configured to cause rendering of the limited user identification interface to the group-based communication interface based on the limited user identification object. In some embodiments, the limited user identification object is transmitted by the apparatus to the client device so that the client device may render, via a display of the client device, the limited user identification interface to the group-based communication interface based on the limited user identification object.

In some embodiments, the apparatus is configured to cause transmission of a client device hold instruction to a client device associated with the user identification query. In such embodiments, the client device hold instruction is transmitted in response to determining the pending status for the target user identifier. The apparatus is further configured to cause comparison of the target user identifier to a group connection array associated with the requesting user identifier to determine a resolved known status or a resolved unknown status. In such embodiments, comparison of the target user identifier to a group connection array is triggered in response to determining the pending status for the target user identifier.

In some embodiments, the apparatus is configured to cause transmission of a first client device hold instruction to a first client device associated with the requesting user identifier in response to determining the pending status for the target user identifier. The apparatus is configured to retrieve a second user identification query associated with the group-based communication interface. In such embodiments, the second user identification query comprises a second requesting user identifier and the target user identifier. The apparatus is configured to cause transmission of a second client device hold instruction to a second client device associated with the second requesting user identifier.

The apparatus is configured to cause comparison of the target user identifier to a group connection array to determine a resolved known status or a resolved unknown status for the target user identifier. In some embodiments, the apparatus is configured to cause retrieval of a limited user identification object associated with the target user identifier in response to determining the resolved unknown status for the target user identifier. The apparatus is configured to transmit the limited user identification object to the client device and to the second client device for rendering the limited user identification interface to the group-based communication interface based on the limited user identification object. In such embodiments, the limited user identification interface is rendered via displays of the client device and the second client device.

In embodiments, the apparatus is configured to cause updating of the user status cache to replace the pending status for the target user identifier with the determined resolved known status or the resolved unknown status.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE SEVERAL VIEWS OF THE DRAWINGS

Figure 1:
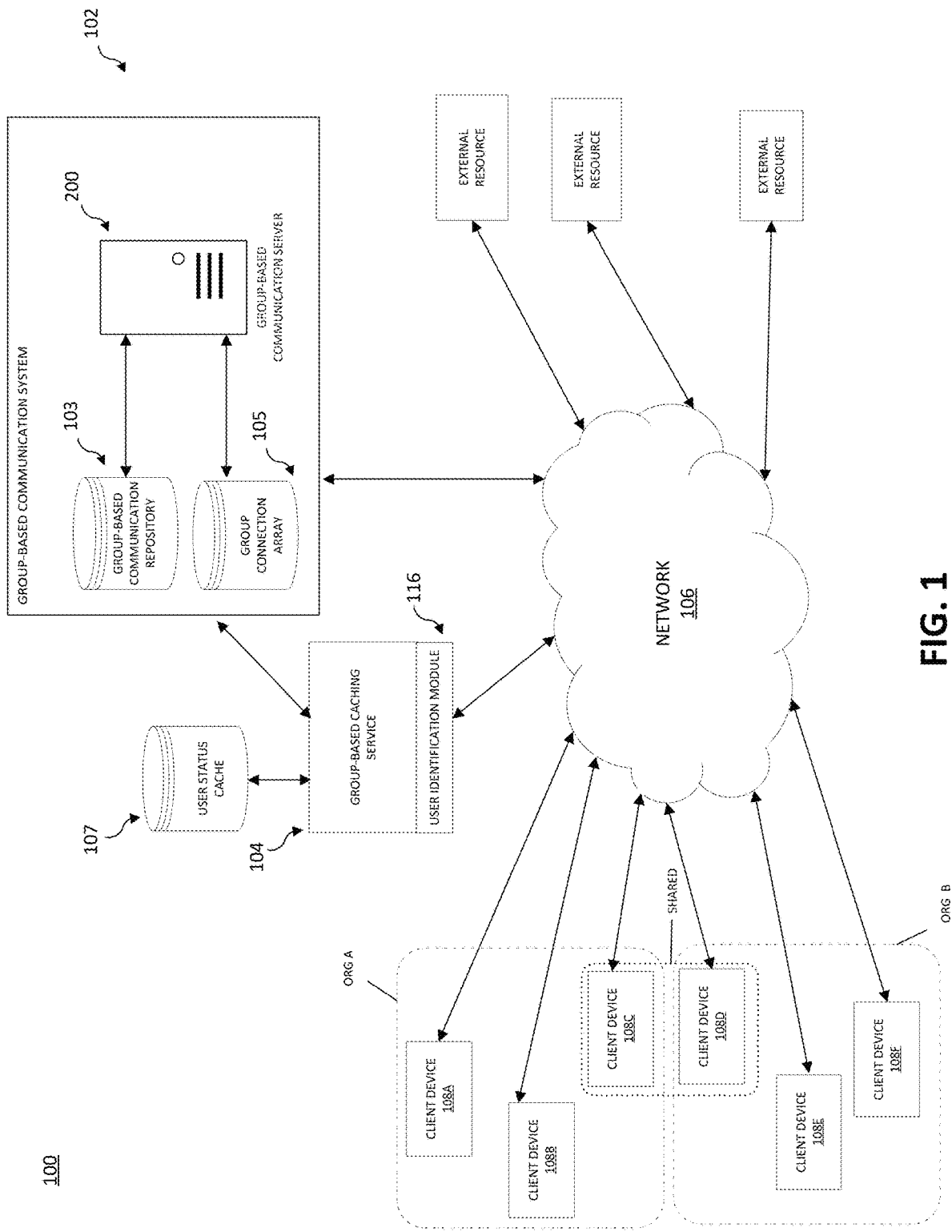
Figure 2A:
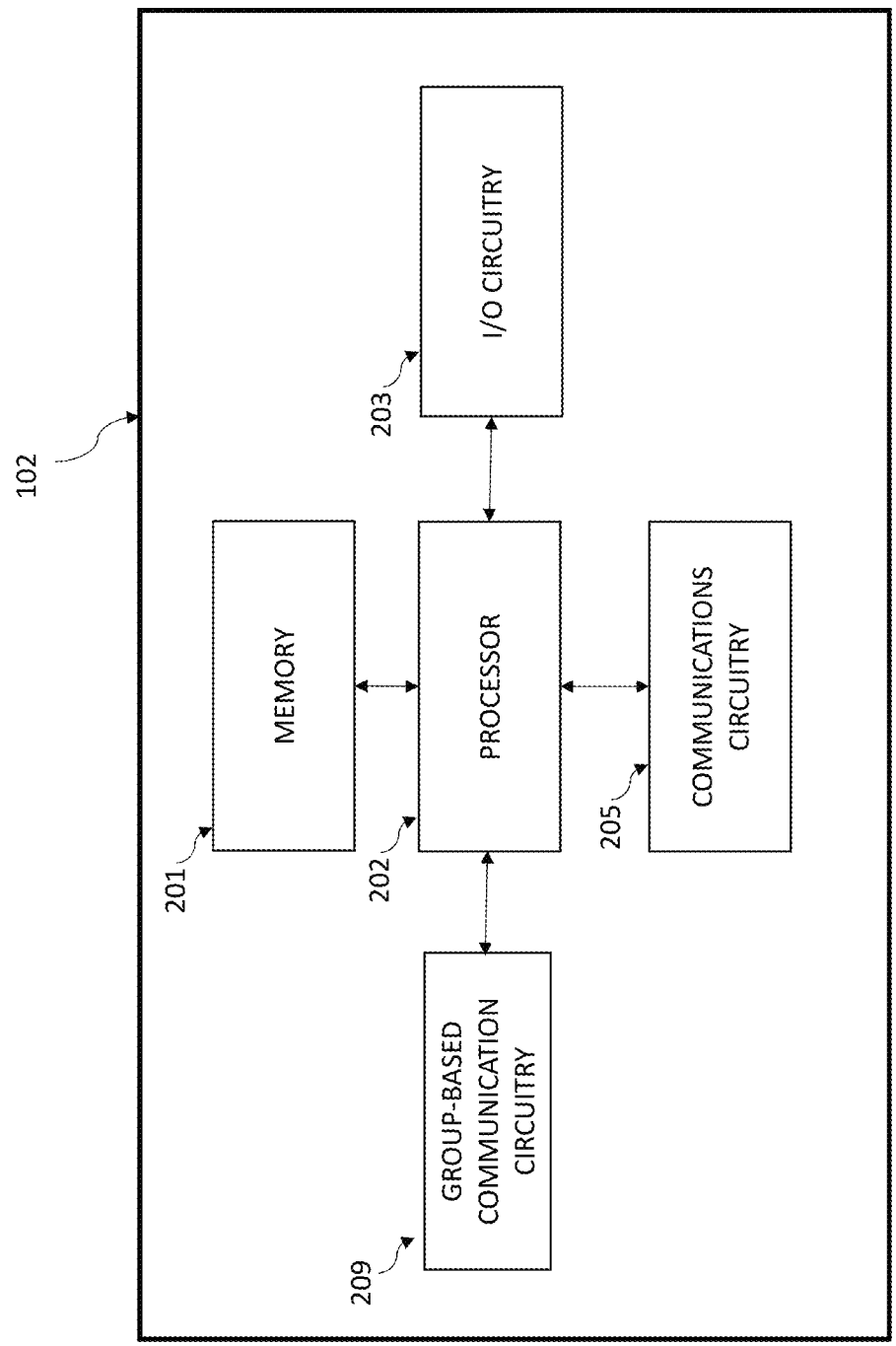
Figure 2B:
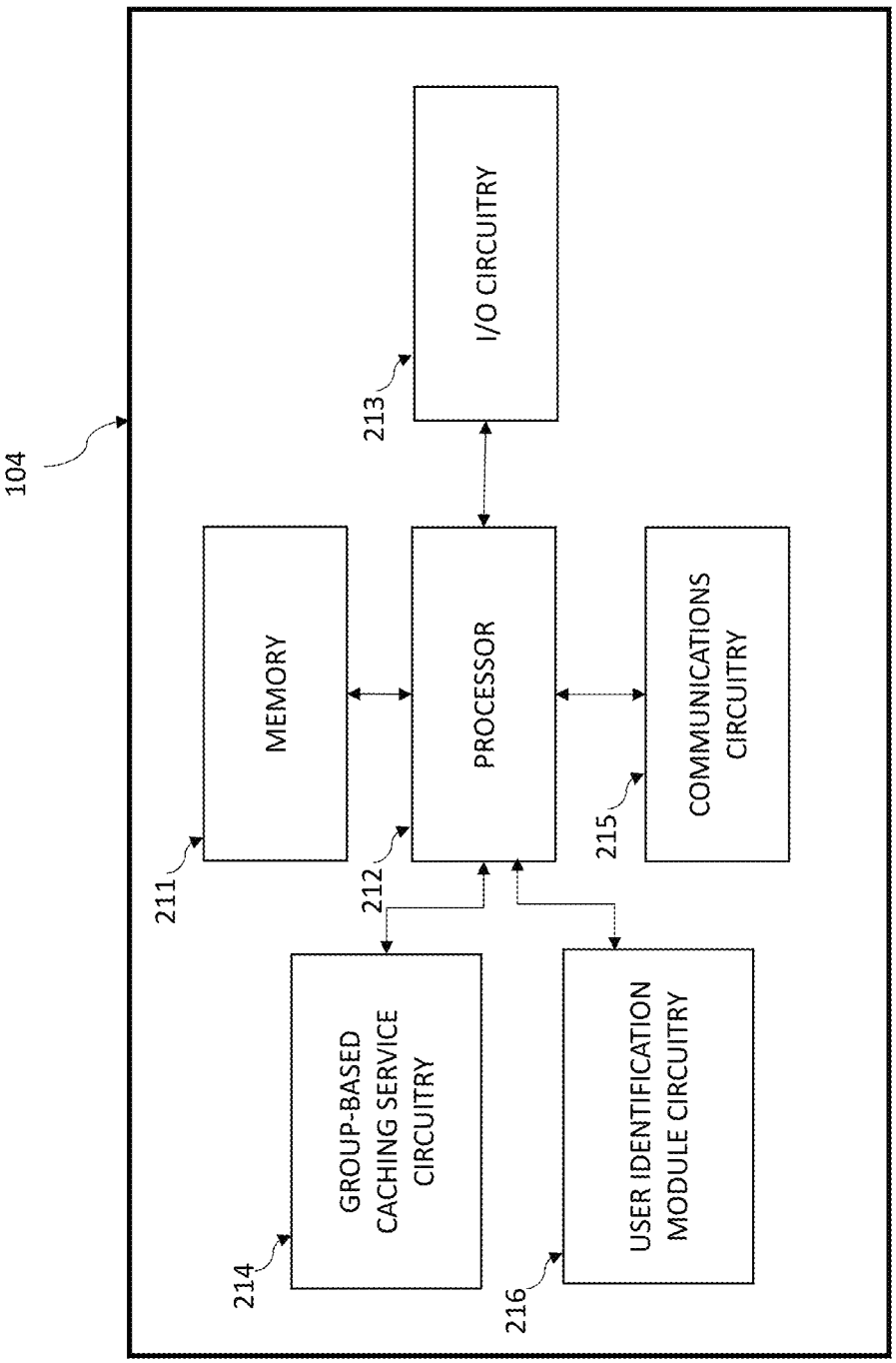
Figure 2C:
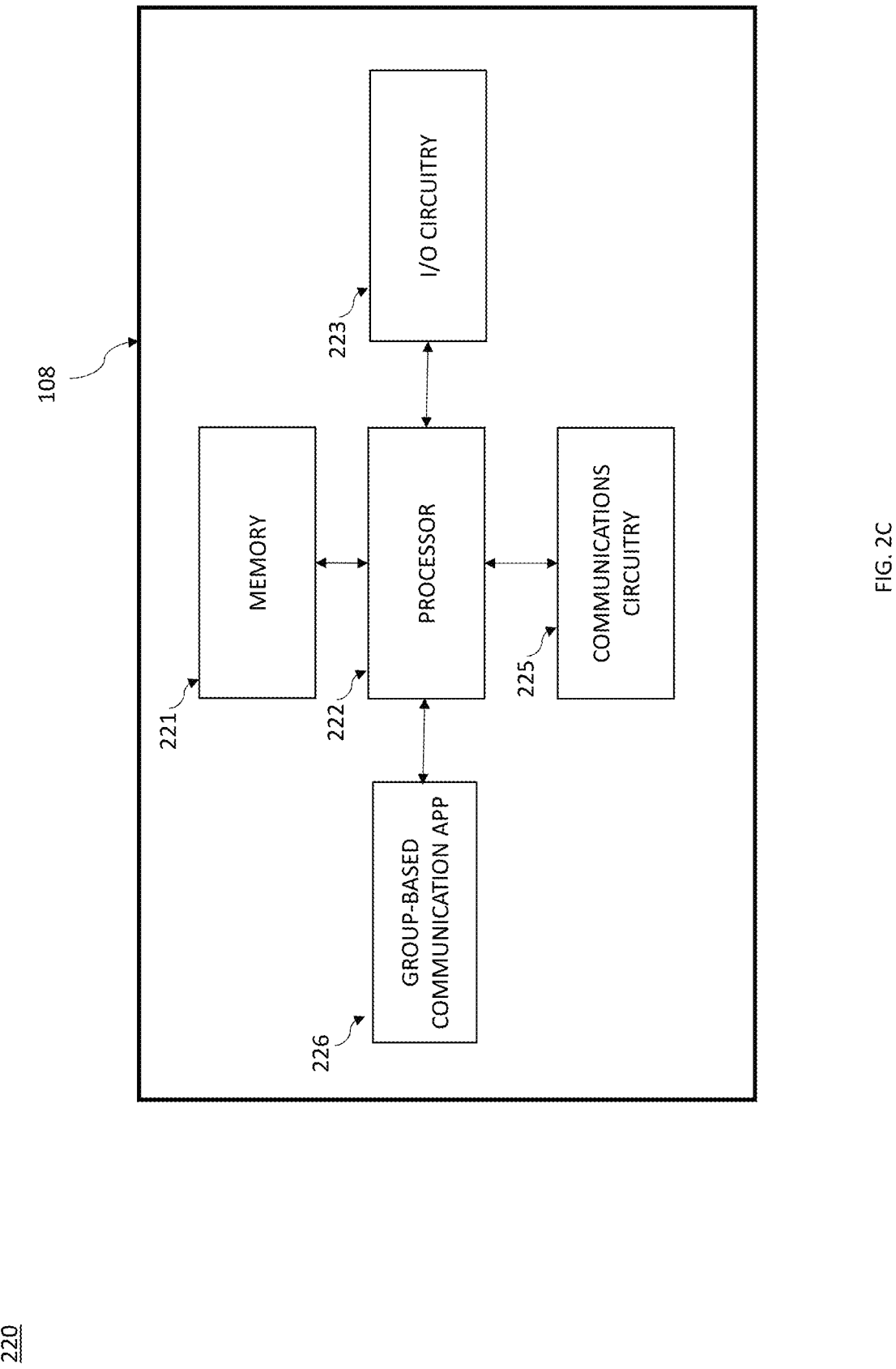
Figure 3A:
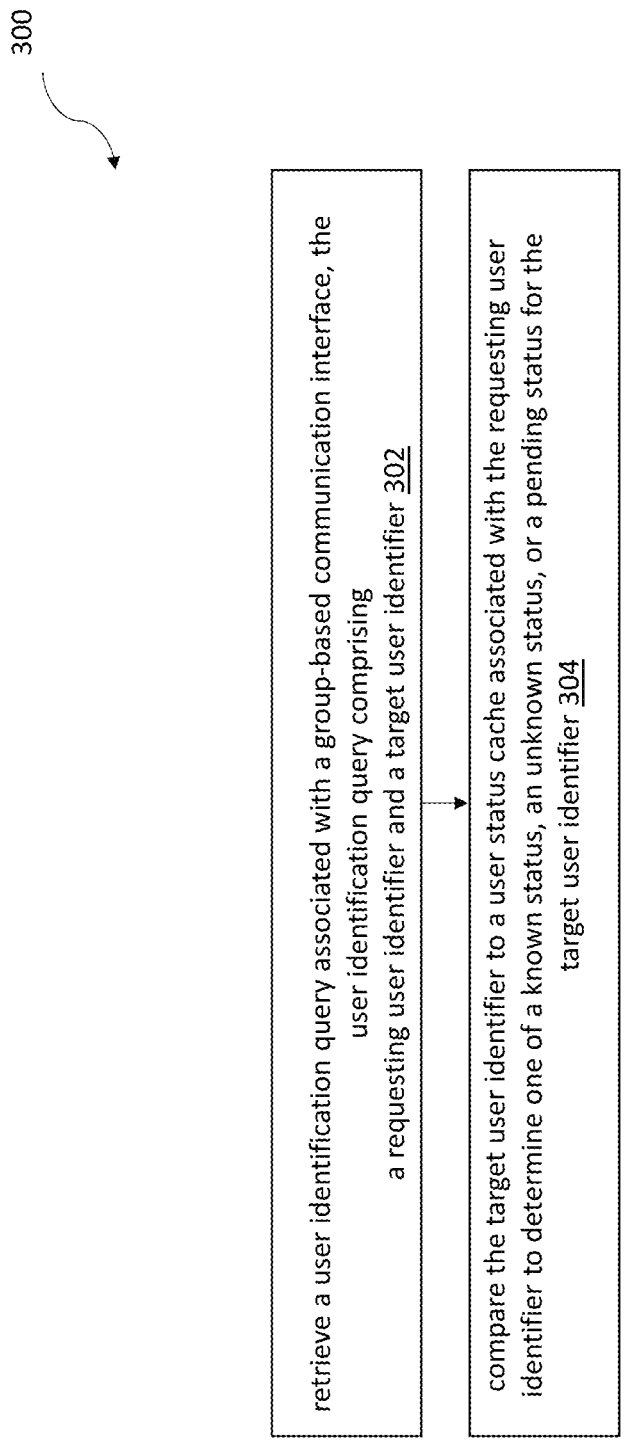
Figures 1, 3B:
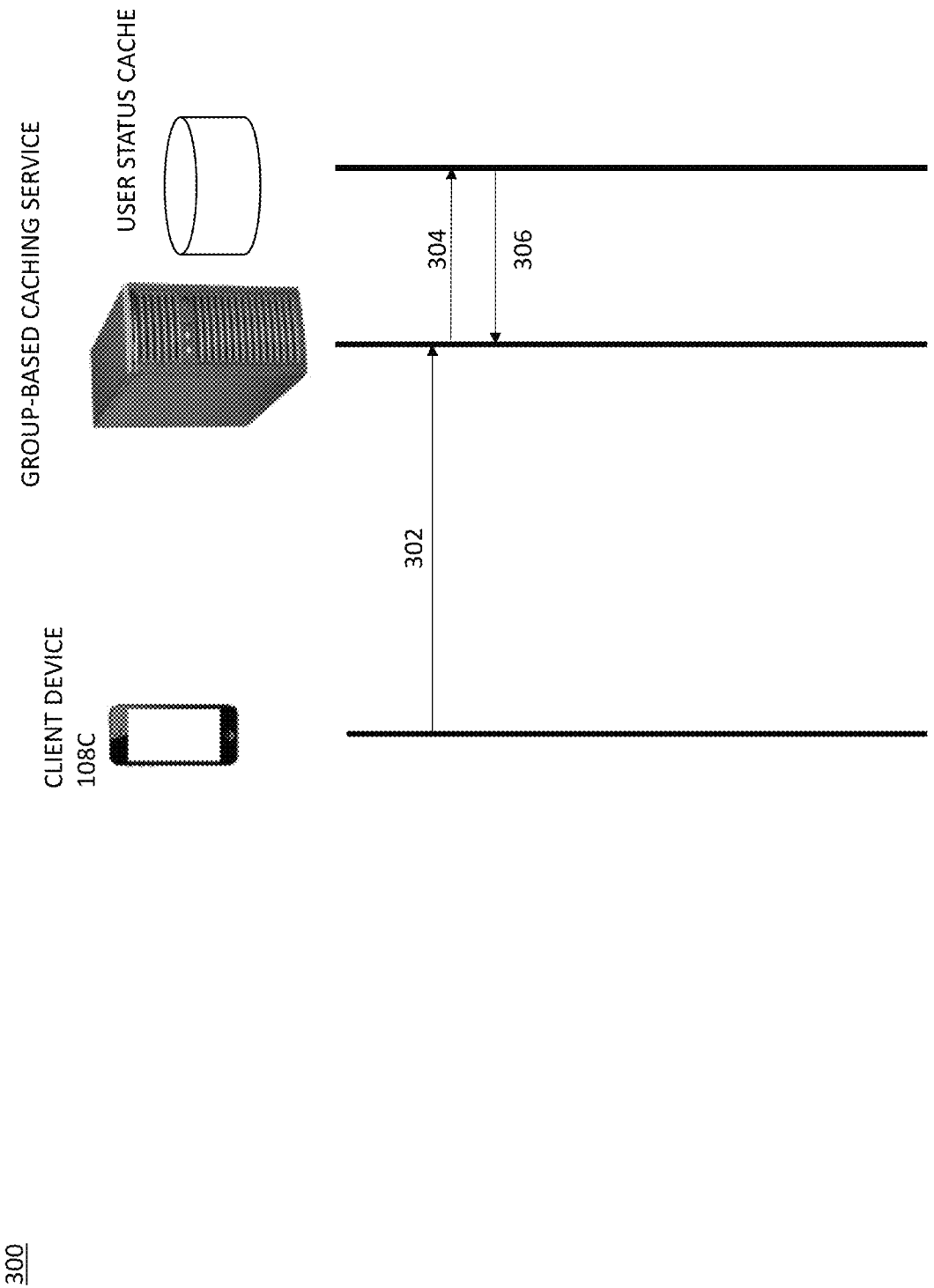
Figures 2, 3B:
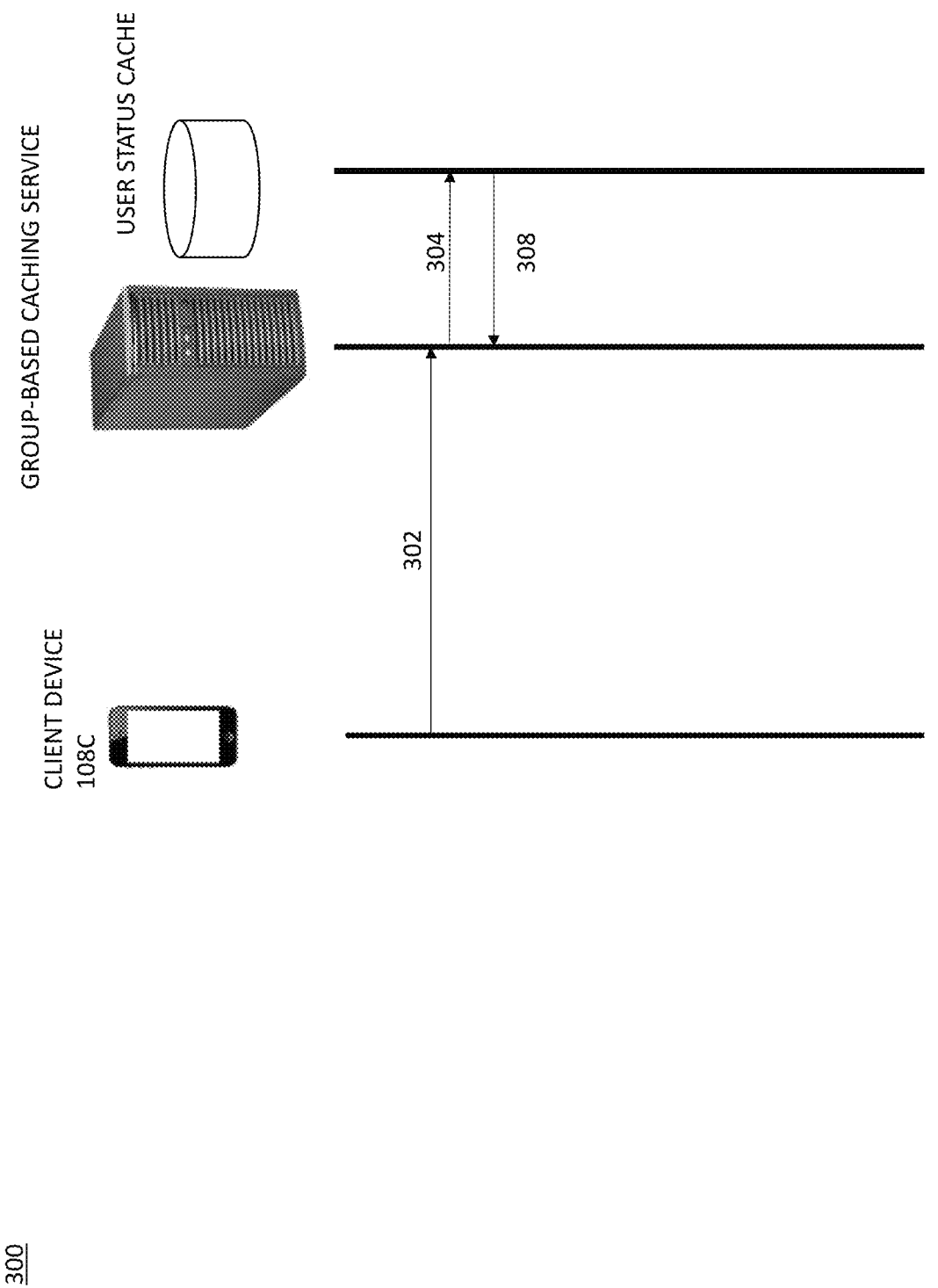
Figures 3, 3B:
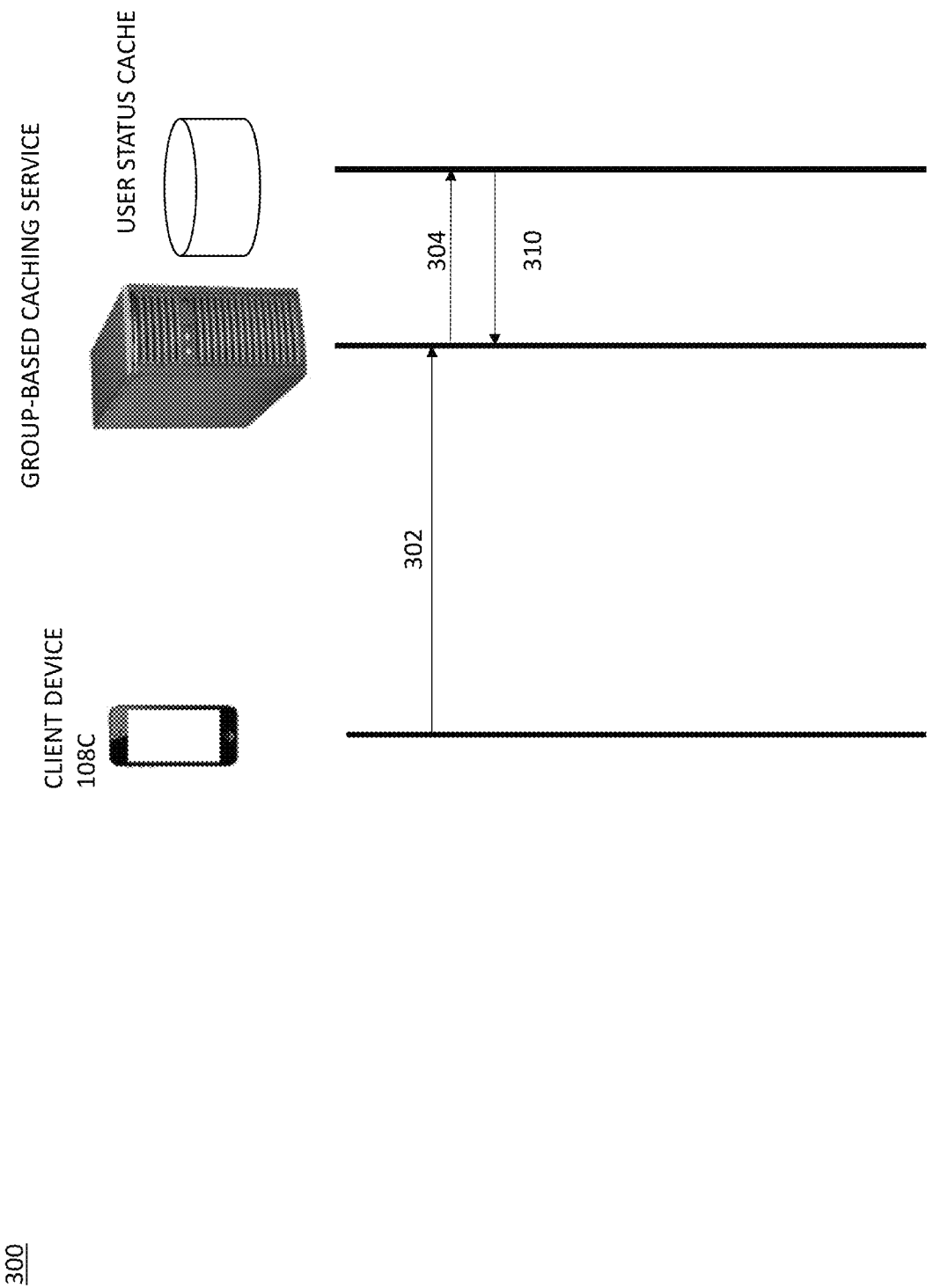
Figure 5B:
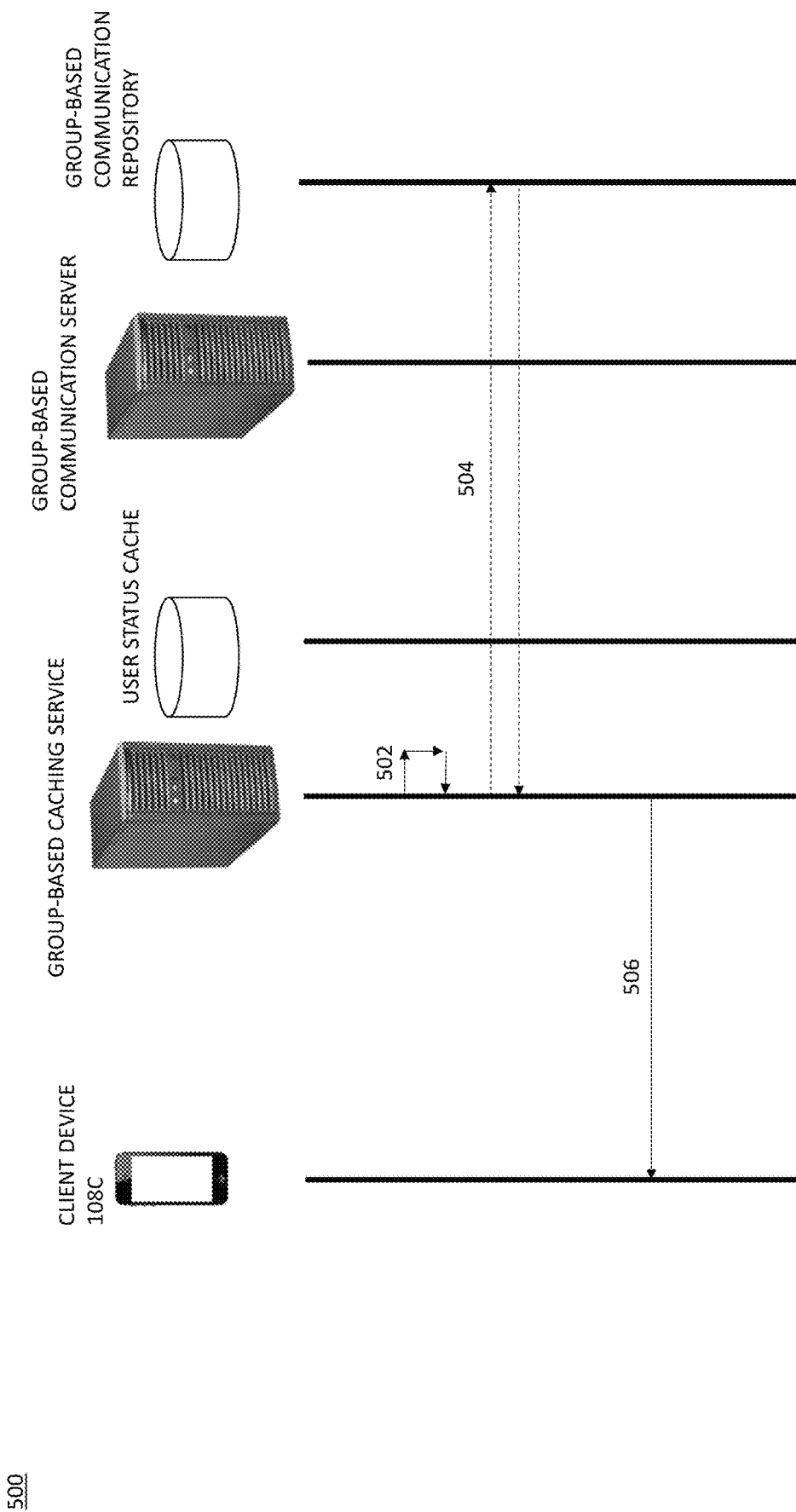
Figures 1, 5C:
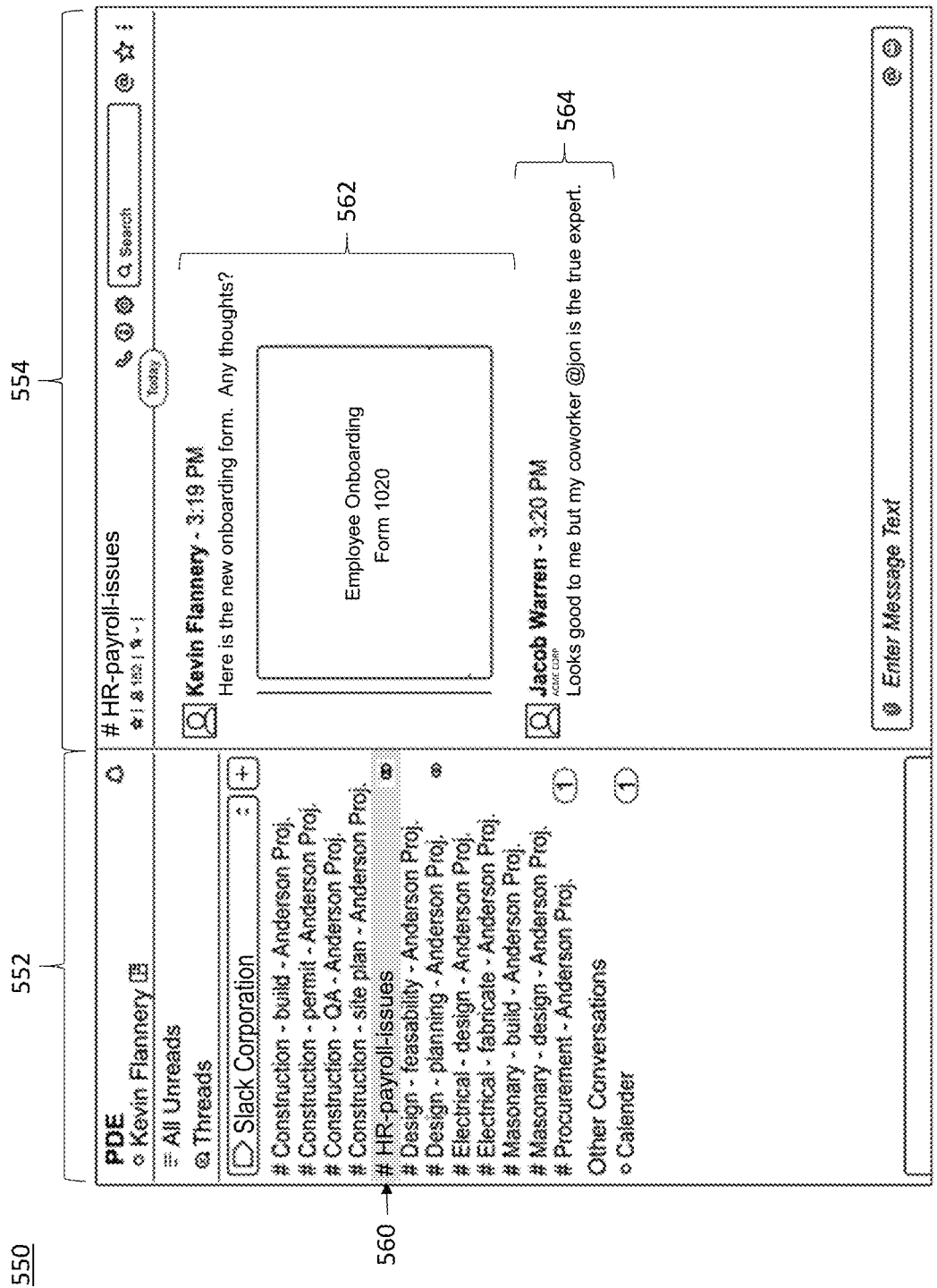
Figures 2, 5C:
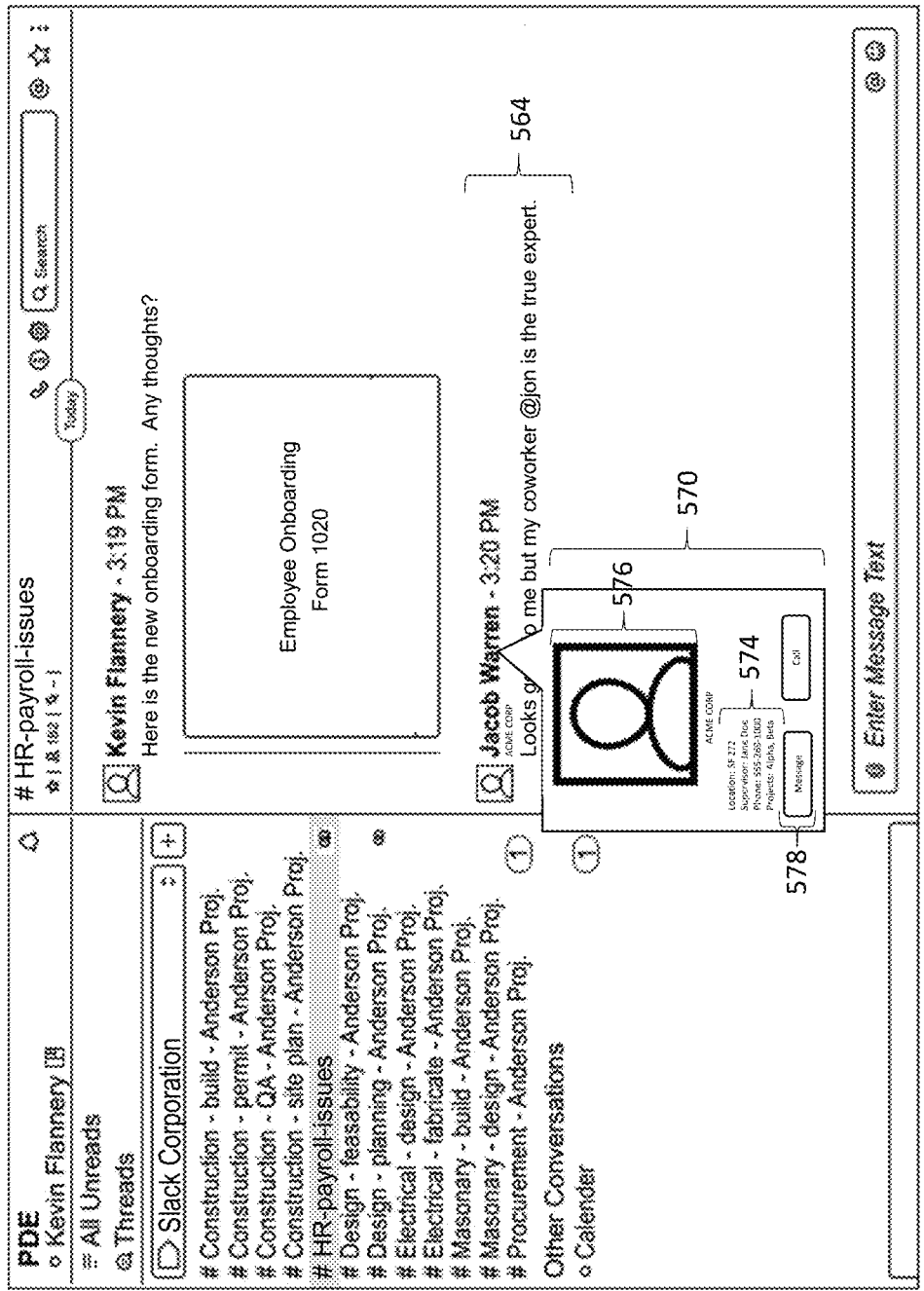
Figures 3, 5C:
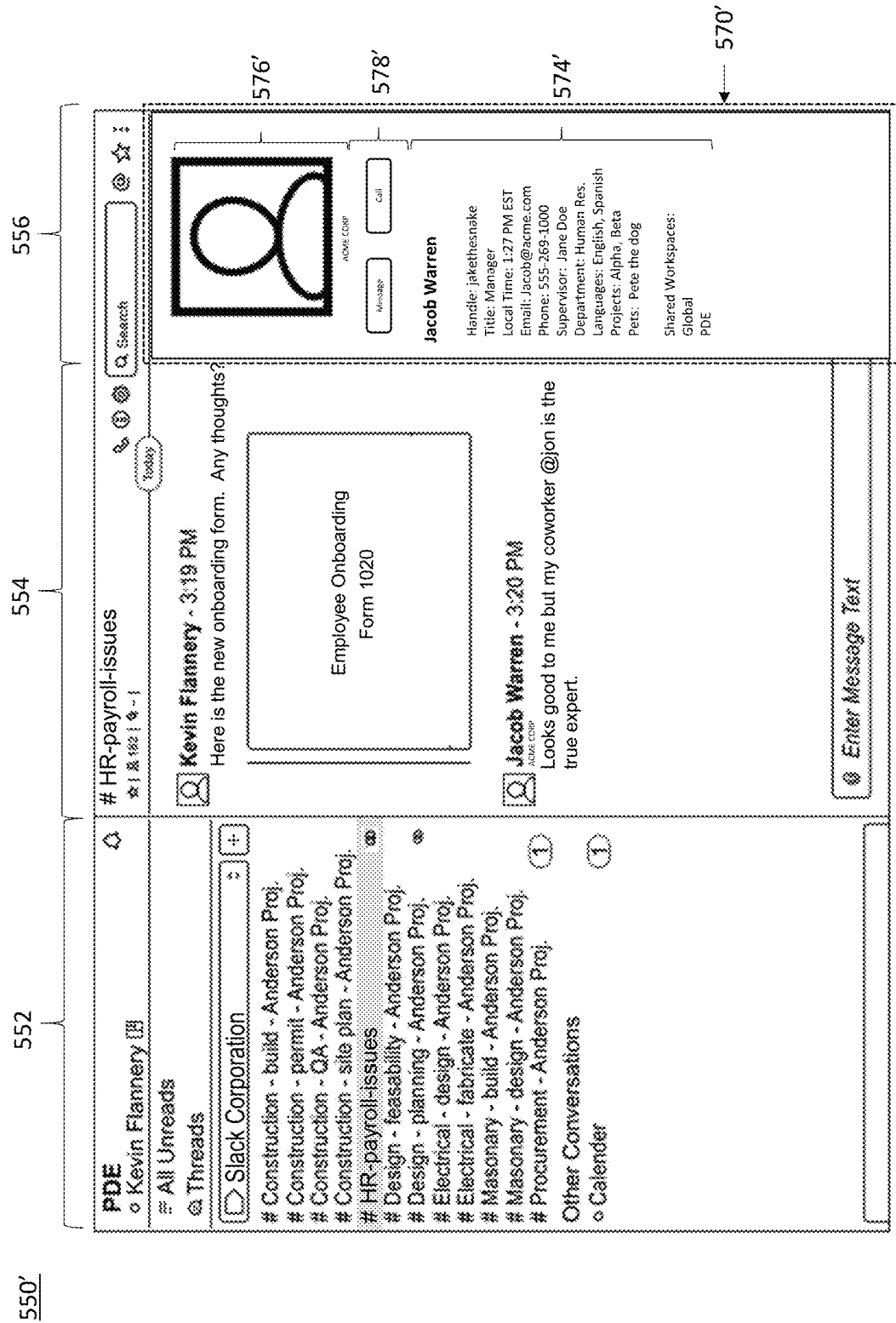
Figures 4, 5C:
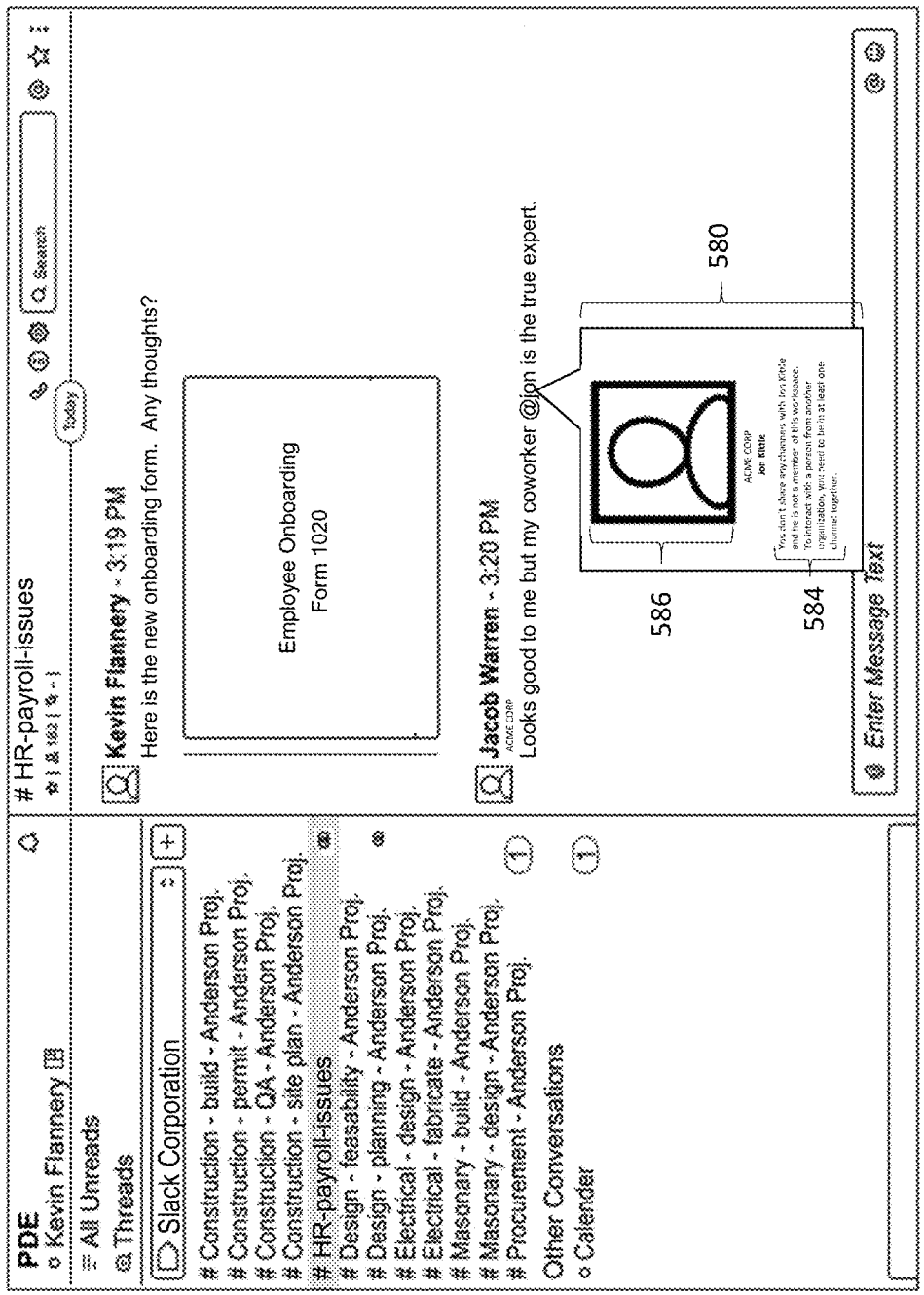
Figure 6A:
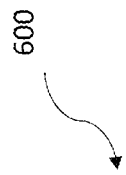
Figure 7A:
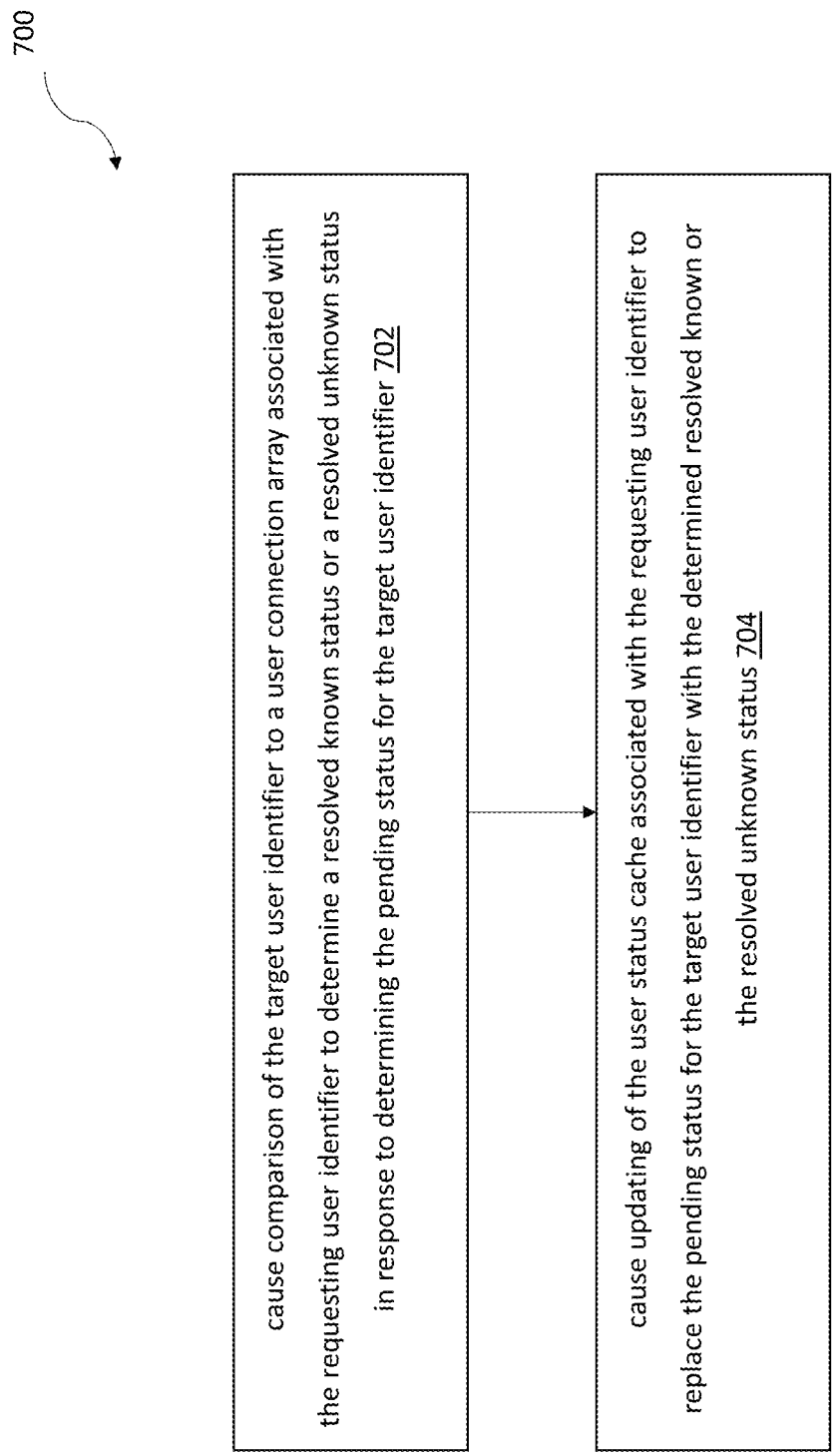
Figures 1, 7B:
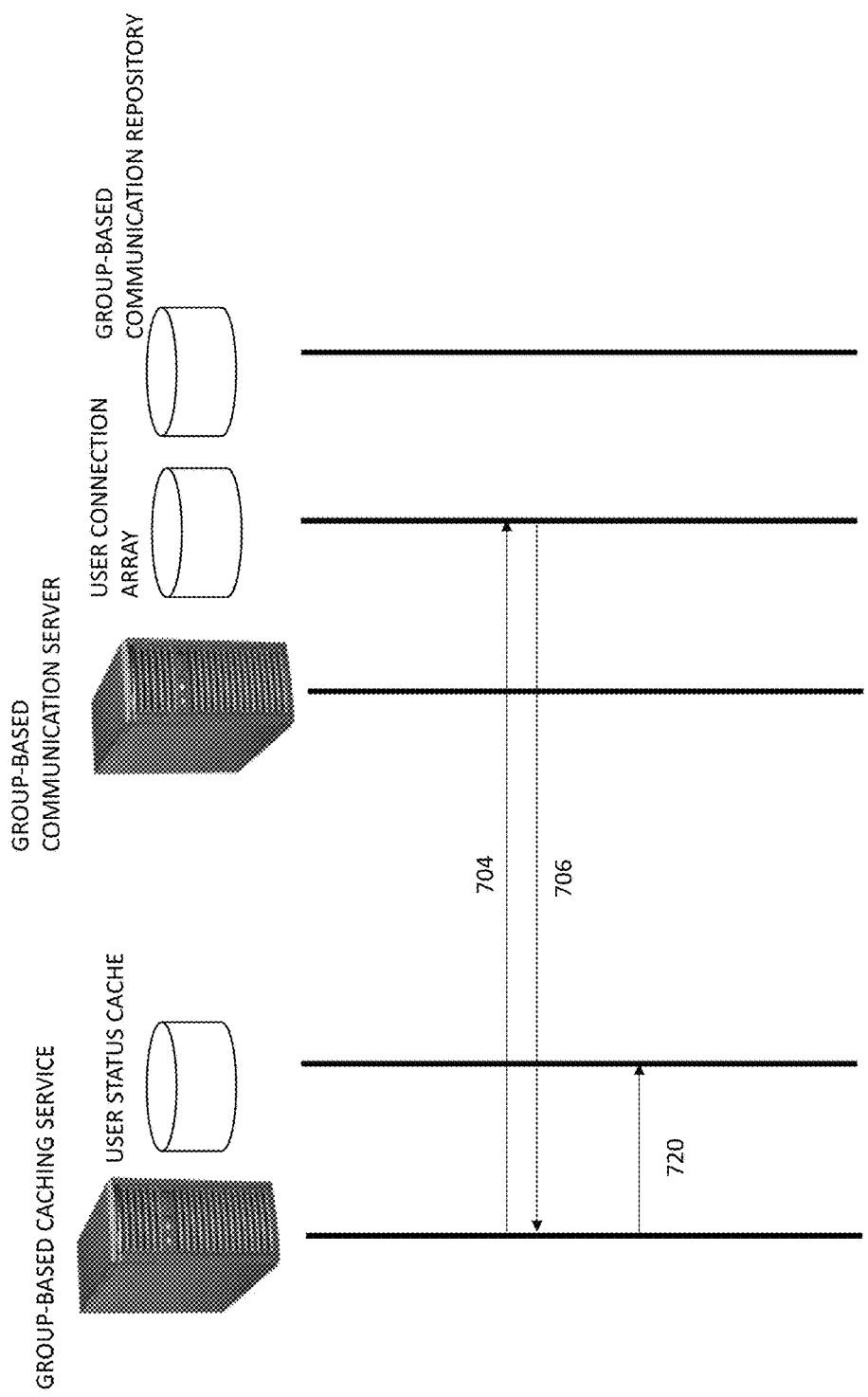
Figure 8A:
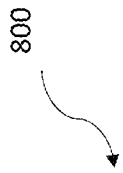
Figure 8B:
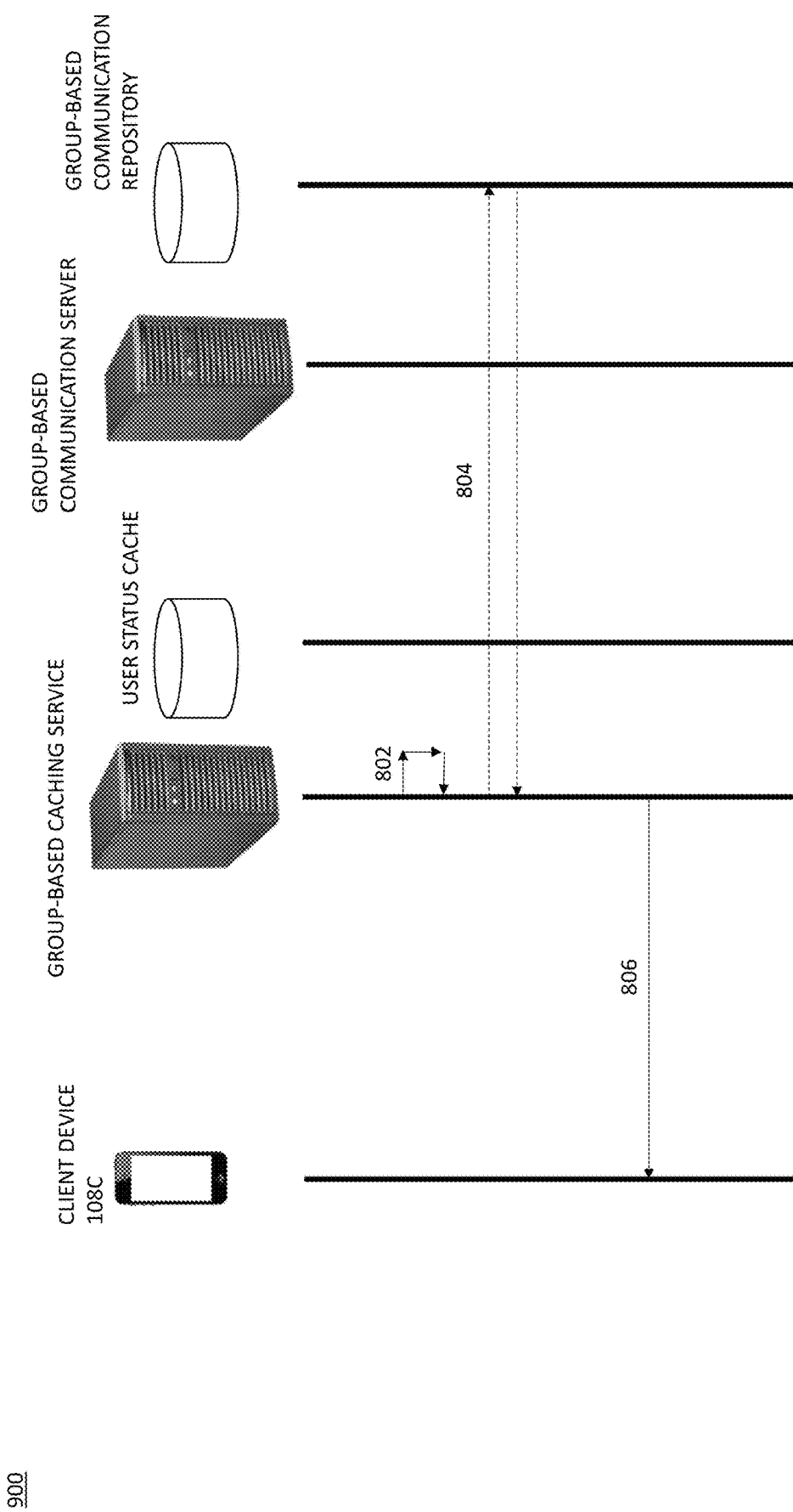
Figure 11A:
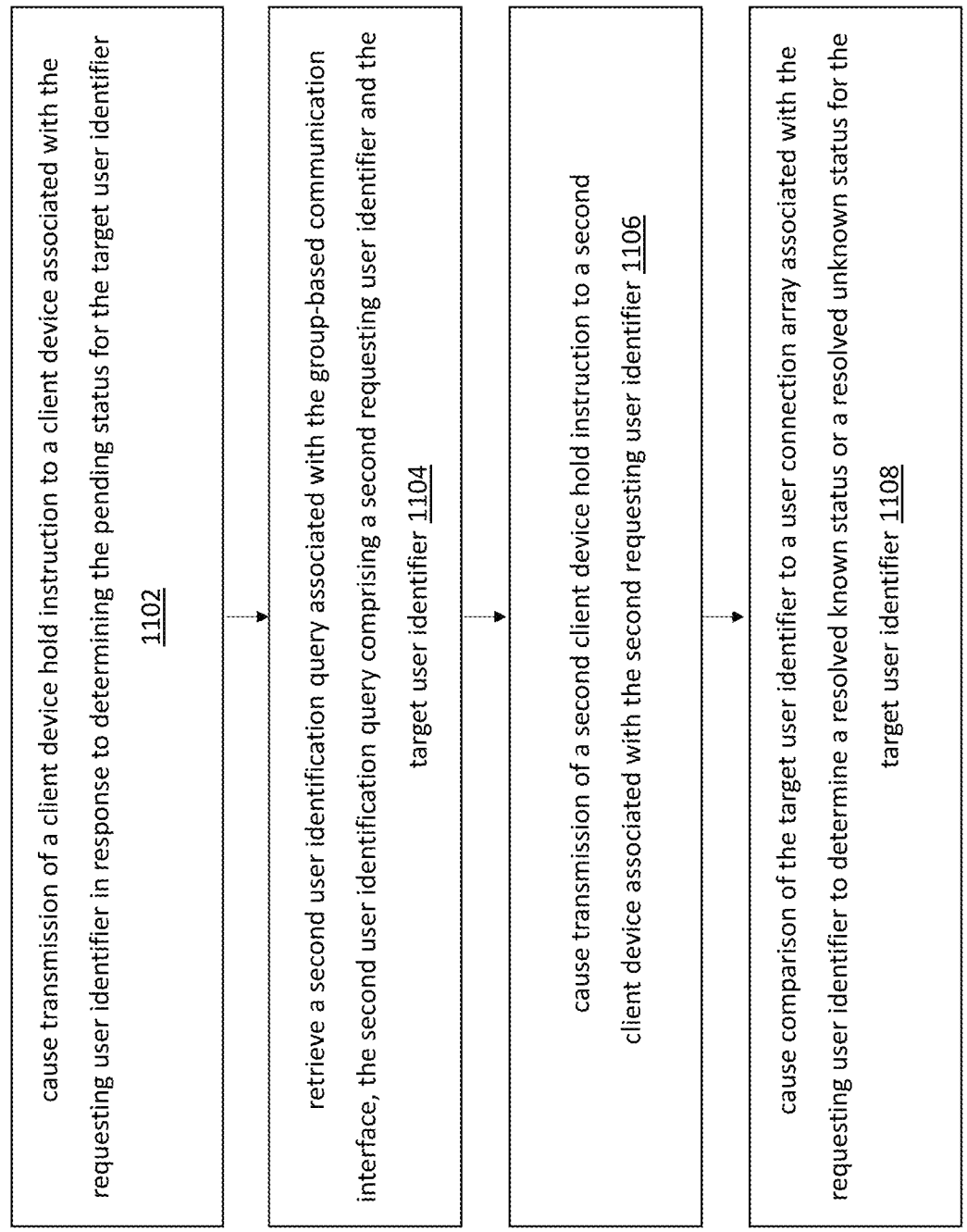
Figure 12A:
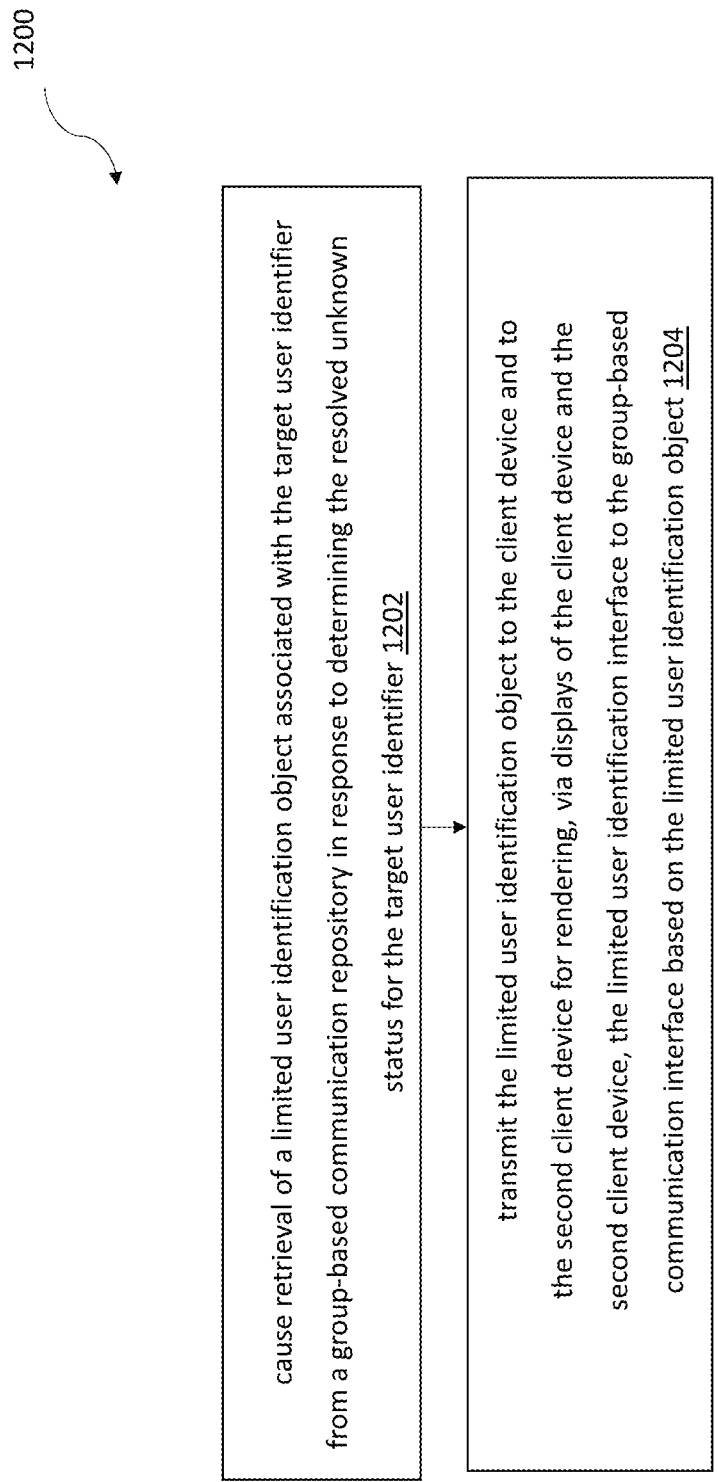
Figure 12B:
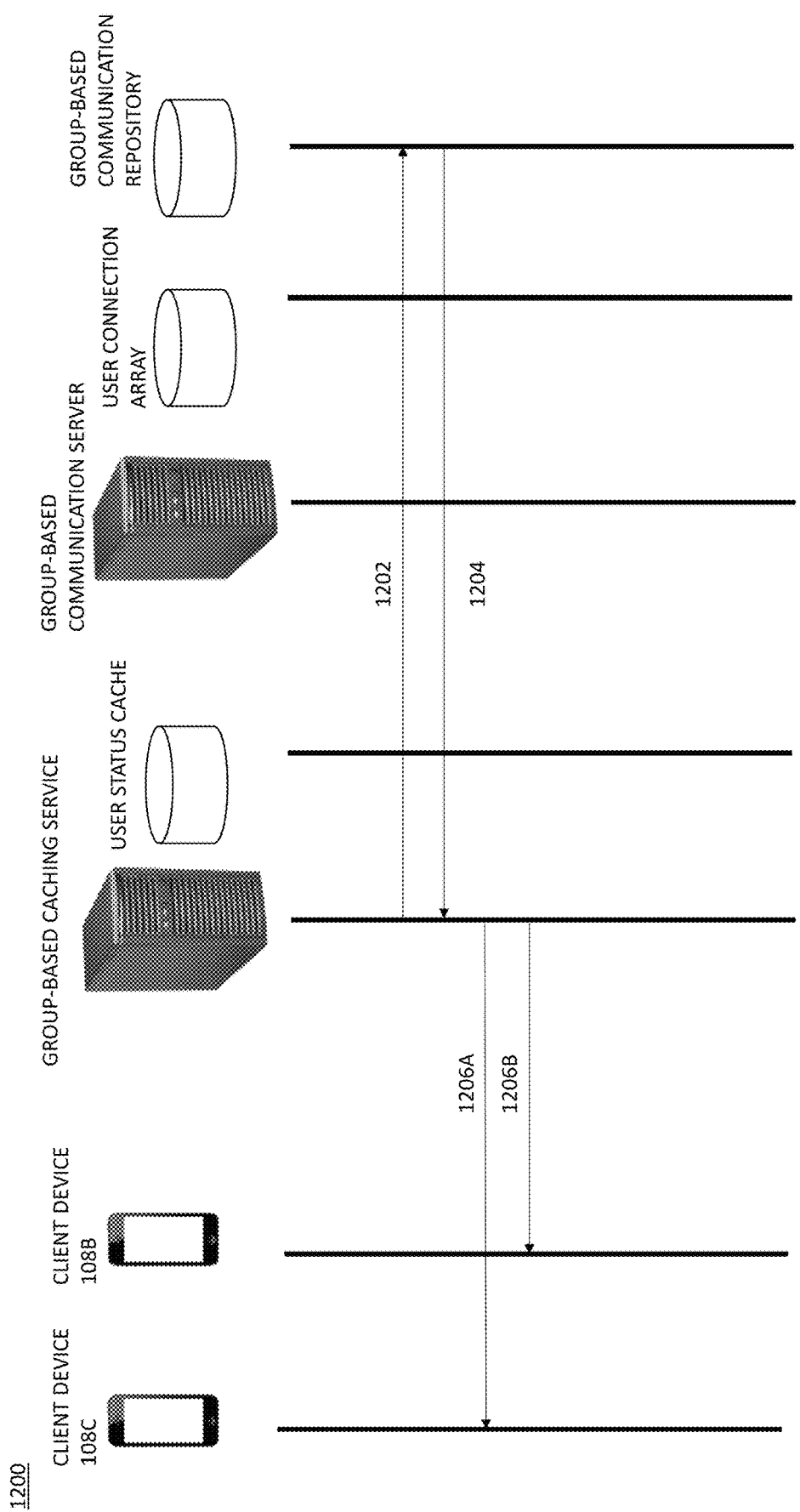

Having thus described some embodiments in general terms, reference will now be made to the accompanying drawings, which are not necessarily drawn to scale, and wherein:

FIG. 1 is a system architecture diagram of a group-based communication network architecture configured to practice embodiments of the present disclosure;

FIGS. 2A-2C are exemplary schematic diagrams of computing entities structured according to embodiments of the present disclosure;

FIG. 3A is a flowchart illustrating example operations for retrieving a user identification query associated with a group-based communication interface and comparing the target user identifier to a user status cache associated with the requesting user identifier to determine one of a known status, an unknown status, or a pending status for the target user identifier in accordance with one embodiment of the present disclosure;

FIG. 3B-1 is an example signal diagram illustrating data flow interactions between a client device, a group-based caching service, and a user status cache when retrieving a user identification query associated with a group-based communication interface and comparing the target user identifier to a user status cache associated with the requesting user identifier to determine a known user status for a target user identifier in accordance with one embodiment of the present disclosure;

FIG. 3B-2 is an example signal diagram illustrating data flow interactions between a client device, a group-based caching service, and a user status cache when retrieving a user identification query associated with a group-based communication interface and comparing the target user identifier to a user status cache associated with the requesting user identifier to determine an unknown user status for a target user identifier in accordance with one embodiment of the present disclosure;

FIG. 3B-3 is an example signal diagram illustrating data flow interactions between a client device, a group-based caching service, and a user status cache when retrieving a user identification query associated with a group-based communication interface and comparing the target user identifier to a user status cache associated with the requesting user identifier to determine a pending user status for a target user identifier in accordance with one embodiment of the present disclosure;

FIG. 4A is a flowchart illustrating an example operation for causing rendering of a known user identification interface to the group-based communication interface in response to determining the known status for the target user identifier in accordance with one embodiment of the present disclosure;

FIG. 4B is an example signal diagram illustrating data flow operations of a group-based caching service when causing rendering a known user identification interface to the group-based communication interface in response to determining the known status for the target user identifier in accordance with one embodiment of the present disclosure;

FIG. 5A is a flowchart illustrating an example operation for causing rendering of a limited user identification interface to the group-based communication interface in response to determining the unknown status for the target user identifier in accordance with one embodiment of the present disclosure;

FIG. 5B is an example signal diagram illustrating data flow operations of a group-based caching service when causing rendering a limited user identification interface to the group-based communication interface in response to determining the unknown status for the target user identifier in accordance with one embodiment of the present disclosure;

FIG. 5C-1 is an example group-based communication interface depicting an example externally shared communication channel structured in accordance with one embodiment of the present disclosure;

FIG. 5C-2 is an example group-based communication interface depicting an example known user identification interface structured in accordance with one embodiment of the present disclosure;

FIG. 5C-3 is an example group-based communication interface depicting an alternative known user identification interface structured in accordance with one embodiment of the present disclosure;

FIG. 5C-4 is an example group-based communication interface depicting an example limited user identification interface structured in accordance with one embodiment of the present disclosure;

FIG. 6A is a flowchart illustrating an example operation for causing transmission of a client device hold instruction in response to determining the pending status for the target user identifier in accordance with one embodiment of the present disclosure;

FIG. 6B is an example signal diagram illustrating data flow interactions between a client device, and a group-based caching service when causing transmission of a client device hold instruction in response to determining the pending status for the target user identifier in accordance with one embodiment of the present disclosure;

FIG. 7A is a flowchart illustrating an example operation for causing comparison of the target user identifier to a group connection array associated with the requesting user identifier to determine a resolved known status or a resolved unknown status in accordance with one embodiment of the present disclosure;

FIG. 7B-1 is an example signal diagram illustrating data flow interactions between a group-based caching service and a group connection array when causing comparison of the target user identifier to the group connection array associated with the requesting user identifier to determine a resolved known status in accordance with one embodiment of the present disclosure;

FIG. 7B-2 is an example signal diagram illustrating data flow interactions between a group-based caching service and a group connection array when causing comparison of the target user identifier to the group connection array associated with the requesting user identifier to determine a resolved unknown status in accordance with one embodiment of the present disclosure;

FIG. 8A is a flowchart illustrating an example operation for causing rendering of a known user identification interface to the group-based communication interface in response to determining the resolved known status for the target user identifier in accordance with one embodiment of the present disclosure;

FIG. 8B is an example signal diagram illustrating data flow operations of a group-based caching service when causing rendering of a known user identification interface to the group-based communication interface in accordance with one embodiment of the present disclosure;

FIG. 9A is a flowchart illustrating an example operation for causing rendering of a limited user identification interface to the group-based communication interface in response to determining the resolved unknown status for the target user identifier in accordance with one embodiment of the present disclosure;

FIG. 9B is an example signal diagram illustrating data flow operations of a group-based caching service when causing rendering of a limited user identification interface to the group-based communication interface in response to determining the resolved unknown status for the target user identifier in accordance with one embodiment of the present disclosure;

FIG. 10A is a flowchart illustrating example operations for causing retrieval of a limited user identification object and transmitting the limited user identification object to a client device for rendering the limited user identification object to the group-based communication interface in accordance with one embodiment of the present disclosure;

FIG. 10B is an example signal diagram illustrating data flow operations of a client device, a group-based caching service, and a group-based communication repository when causing retrieval of a limited user identification object and transmitting the limited user identification object to a client device for rendering the limited user identification object to the group-based communication interface in accordance with one embodiment of the present disclosure;

FIG. 11A is a flowchart illustrating example operations for causing transmission of a client device hold instruction to a client device, receiving a second user identification query associated with the group-based communication interface, causing transmission of a second client device hold instruction to a second client device associated with the second requesting user identifier, and causing comparison of the target user identifier to a group connection array associated with the requesting user identifier to determine a resolved known status or a resolved unknown status for the target user identifier in accordance with a preferred embodiment of the present disclosure;

FIG. 11B-1 is an example signal diagram illustrating data flow operations between a client device, a second client device, a group-based caching service, and a group connection array when causing transmission of a client device hold instruction to a client device, receiving a second user identification query associated with the group-based communication interface, causing transmission of a second client device hold instruction to a second client device associated with the second requesting user identifier, and causing comparison of the target user identifier to a group connection array associated with the requesting user identifier to determine a resolved known status for the target user identifier in accordance with a preferred embodiment of the present disclosure;

FIG. 11B-2 is an example signal diagram illustrating data flow operations between a client device, a second client device, a group-based caching service, and a group connection array when causing transmission of a client device hold instruction to a client device, receiving a second user identification query associated with the group-based communication interface, causing transmission of a second client device hold instruction to a second client device associated with the second requesting user identifier, and causing comparison of the target user identifier to a group connection array associated with the requesting user identifier to determine a resolved unknown status for the target user identifier in accordance with a preferred embodiment of the present disclosure;

FIG. 12A is a flowchart illustrating example operations for causing retrieval of a limited user identification object and transmitting the limited user identification object to the client device and to the second client device for rendering in accordance with a preferred embodiment of the present disclosure; and FIG. 12B is an example signal diagram illustrating data flow operations between a client device, a second client device, a group-based caching service, and a group-based communication repository when causing retrieval of a limited user identification object and transmitting the limited user identification object to the client device and to the second client device for rendering in accordance with a preferred embodiment of the present disclosure.

DETAILED DESCRIPTION

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Overview

In a group-based communication system, users may communicate and collaborate with one another on a variety of projects, goals, topics, etc. Such communication and collaboration often occur via group-based communication messages that are posted to group-based communication channels. A collection of group-based communication channels may form a group-based communication workspace. For example, a series of marketing focused group-based communication channels may form a marketing group-based communication workspace for a particular organization (e.g., Slack Corporation). The group-based communication system is configured to support several group-based communication workspaces (e.g., a sales group-based communication workspace, an engineering group-based communication workspace, etc.) for a particular organization or group of organizations with each workspace having a plurality of group-based communication channels (e.g., a sales channels for the sales group-based communication workspace, engineering channels for the engineering group-based communication workspace, etc.).

In various embodiments discussed herein, collaboration and communication may occur in group-based communication channels or direct messages between members of different organizations and/or different group-based communication workspaces. For example, Slack Corporation may create a group-based communication channel focused on payroll issues (i.e., #HR-payroll-issues) in its human resources group-based communication workspace and invite users from its payroll service vendor, ACME Corporation, to join. Validated users from Slack and ACME may then post group-based communication messages within the #HR-payroll-issues group-based communication channel to collaborate and communicate on the identification and resolution of various payroll issues. Group-based communication channels such as #HR-payroll-issues that have validated member users from at least two different organizations are referred to herein as "externally shared channels".

It is desirable to maintain privacy protocols over user identification information associated with externally shared channels and associated group-based communication workspaces. The relationship status between users interacting within a group-based communication workspace may be a determinative parameter for certain privacy protocols. For example, group-based communication systems are configured to display a graphic user identification interface from the perspective of an operating user with the system status (e.g., known or unknown) of other users represented in the group-based communication interface determining if private, sensitive, or internal information concerning such other users is displayed to the operating user.

In one example, it may be desirable for employees of Slack Corporation to easily access email, work location, and time zone information for other Slack employees. Thus, the group-based communication interface is configured to readily display such information when Slack employee profiles are selected (e.g., via click, mouseover, or the like) in a group-based communication interface. However, privacy protocols may dictate that such sensitive information be restricted from certain ACME Corporation users even though such users may be mentioned by or otherwise engage with Slack users via the #HR-payroll-issues group-based communication channel.

Group-based communication systems structured in accordance with various embodiments address this need by rendering graphic user identification interfaces referred to as "known user identification interfaces" that represent validated users (e.g., other Slack employees and ACME Corporation employees who are validated to communicate within the #HR-payroll-issues group-based communication channel in the above example) to the group-based communication interface while rendering graphic user identification interfaces referred to as "limited user identification interfaces" that represent non-validated users (e.g., unknown ACME Corporation employees) to the group-based communication interface.

Each group-based communication interface is configured and rendered from the perspective of an operating user. The operating user is referred to herein as a requesting user and user identification queries that include a requesting user identifier and a target user identifier are issued by a client device when it is necessary to work out if a target user (e.g., a user @-mentioned in the #HR-payroll-issues group-based communication channel) should be represented in the group-based communication interface by a known user identification interface or a limited user identification interface. The group-based communication system determines if the target user is validated relative to the requesting user (i.e., the operating user) and provides appropriate instructions to the client device for rendering the group-based communication interface in compliance with appropriate privacy protocols.

Rapid determination of target user status relative to all operating users can pose system resource drain and system outage risk as the size and complexity of group-based communication workspaces increase. Resolution of a large number of user identification queries could exhaust a group-based communications server. For example, Slack Corporation may comprise 20,000 or more users. Of those users, 10,000 may belong to an externally shared channel (i.e., the #HR-payroll-issues group-based communication channel). User 1 in this externally shared channel may @-mention User 2, who is an employee of ACME Corporation but is not a validated member of the externally shared channel. In order to render an appropriate graphic user identification interface for User 2, the group-based communication system must determine the system status for User 2 relative to each of the 10,000 users belonging to the #HR-payroll-issues group-based communication channel. This is undesirable because it is computationally intensive and represents a security vulnerability in that it might be susceptible to distributed denial of service (DDOS) attacks by malicious actors. Thus, various embodiments discussed herein mediate and resolve voluminous user identification queries through a specially configured group-based caching service and associated system architecture that is discussed in detail below.

Definitions

Certain terms used in connection with exemplary embodiments are defined below.

The term "group-based" is used herein to refer to a system, channel, communication, message, or virtual environment that has security sufficient such that the system, channel, communication, message, or virtual environment is accessible only to a defined group of users (e.g., users having a common group identifier associated with their respective user profiles). In some embodiments, the group is defined by common access credentials, such as those of an organization or commercial enterprise. In still further embodiments, access is further facilitated by a validated request to join or an invitation to join transmitted by one group member user to another non-member user. Group identifiers (defined below) are used to associate data, information, messages, users, group-based communication channels, etc., with specific groups of a group-based communication system as defined below.

The term "group-based communication system" refers to the communications software platform and associated hardware that is configured to support and maintain a plurality of group-based communication workspaces and all associated functionality, including through which client devices communicate and interact in a group-based setting. Group-based communication system users are organized into organization groups (e.g., in certain embodiments, employees of different companies are separate organization groups) and each organization group interacts with the system via at least one group-based communication workspace. For example, the group-based communication system might support, among others, a plurality of workspaces associated with Slack Corporation and a plurality of workspaces associated with ACME Corporation. Example group-based communication systems comprise supporting servers (e.g., a group-based communication server), databases (e.g., a group-based communication repository, a group connection array), services (e.g., a group-based caching service), and client devices, and are further configured to engage with external resources and external applications.

Group-based communication system users are organized into organization groups (e.g., in certain embodiments, employees of each company are a separate organization group) and each organization group or sub-group has one or more group-based communication workspaces and/or group-based communication channels to which users are assigned or which the users join (e.g., group-based communication channels can represent departments, geographic locations such as offices, product lines, user interests, topics, issues, and/or the like). In some embodiments, a group identifier is used to facilitate access control for a message (e.g., access to the message, such as having the message return as part of search results in response to a search query, is restricted to those users having the group identifier associated with their user profile). In some embodiments, the group identifier is used to determine context for the message (e.g., in certain embodiments, a description of the group, such as the name of the group and/or a brief description of the group, is associated with the group identifier).

A user may access the group-based communication system via a client device to enable access to one or more group-based communication interfaces including various information and/or data linked to group-based communication workspaces and/or group-based communication channels associated with an authenticated user account. Each user account may be provisioned to access one or more group-based communication workspaces and/or associated group-based communication channels. Group-based communication system users may join and/or create group-based communication channels. Some group-based communication channels may be globally accessible to those users having a particular organizational identifier associated with their user profile (i.e., users who are members of the organization). Access to some group-based communication channels is restricted to members of specified workspaces, whereby the group-based communication channels are accessible to those users having a particular group identifier associated with their user profile.

In some embodiments, the group-based communication channel identifier is used to facilitate access control for a message (e.g., access to the message, such as having the message return as part of search results in response to a search query, is restricted to those users having the group-based communication channel identifier associated with their user profile, or who have the ability to join the group-based communication channel). In certain embodiments, the group-based communication channel identifier is used to determine context for the message (e.g., a description of the group-based communication channel, such as a description of a project discussed in the group-based communication channel, is associated with the group-based communication channel identifier).

The term "group-based communication platform" refers to a computing platform embodied for the purpose of supporting a group-based communication system, as a collection of computing services that are accessible to one or more client devices, and that are operable to provide access to a plurality of software applications related to operations of databases. In some examples, the group-based communication platform takes the form of one or more central servers disposed in communication with one or more additional servers running software applications and having access to one or more databases storing digital content items, application-related data, and/or the like.

The term "group-based communication server" refers to a software platform and associated hardware that is configured to manage access to the various group-based communication interfaces of the group-based communication system. The group-based communication server is configured to access, maintain, and support application product logic of the group-based communication system and to access one or more data repositories such as a group-based communication repository and a group connection array. The group-based communication server is configured for interacting with various client devices for receiving and/or disseminating messages for distribution within communication channels. Group-based communication servers may be configured to receive, store (in an associated database), and/or direct messages exchanged between users (operating via client devices).

The functionality of the group-based communication servers may be provided via a single server or collection of servers having a common functionality, or the functionality of the group-based communication servers may be segmented among a plurality of servers or collections of servers performing subsets of the described functionality of the group-based communication servers. For example, a first subset of group-based communication servers may be configured for receiving messages from client devices and/or for transmitting messages to client devices (e.g., via one or more interface servers). These group-based communication servers may be in communication with a second subset of group-based communication servers configured for collecting messages distributed within communication channels and for storing those messages within a message repository database for indexing and archiving.

The term "group-based communication interface" refers to a graphical user interface of a group-based communication system that is configured to allow users to (e.g., group members) to view and engage a group-based communication workspace. A group-based communication interface is rendered to a client device based on data and instructions provided by the group-based communication system. In some embodiments, such data and instructions are facilitated by a dedicated software application running on the client device (e.g., a mobile phone). In other embodiments, such data and instructions are provided through a web browser running on the client device (e.g., a laptop or desktop device).

The term "group-based communication workspace" refers to a virtual communications environment configured to facilitate user interaction with a group-based communication system, the virtual communications environment having restricted access such that it is not generally accessible and/or searchable by other members of the group-based communication system. Each group-based communication workspace is accessible and viewable to a select group of users, such as a group of employees of a business or organization (e.g., the Slack Corp. workspace would be accessible and viewable to the Slack employees however the ACME Corporation group-based communication workspace would not be accessible and viewable to Slack employees). In certain embodiments, the group-based communication workspace includes and provides access to a plurality of group-based communication channels (e.g., a marketing channel, a sales channel, an accounting channel, etc.), which are defined herein.

The terms "group-based communication application" or "group-based communication app" refer to a dedicated software program, application, platform, service, web browser, or computer-executable application software programmed or configured to run on a client device that provides the user access to the group-based communication system. Such a group-based communication application is typically designed to execute on mobile devices, such as tablets or smartphones. For example, in certain embodiments, an app is provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system, the group-based communication system, and one or more external resources.

The terms "group-based communication message," "messaging communication," and "message" refer to any electronically generated digital content object provided by a user that has security sufficient such that it is accessible only to a defined group of users and that is configured for display within a group-based communication channel. Messaging communications may include any text, image, video, audio or combination thereof provided by a user (using a client device). For instance, the user may provide a messaging communication that includes text as well as an image and a video within the messaging communication as message contents. In such a case, the text, image, and video would comprise the messaging communication or digital content object. Each message sent or posted to a group-based communication channel of the group-based communication system includes metadata comprising the following: a sending user identifier, a message identifier, message contents, a timestamp associated with the post of the message, a group-based communication channel identifier. Each message sent or posted to a group-based communication thread further includes a group-based communication thread identifier. Each of the foregoing identifiers may comprise ASCII text, a pointer, a memory address, and the like.

A "sending user identifier" is associated with a collection of messages that are sent or posted by a particular user (e.g., sent by a client device associated with the particular user, user identifier, or user profile). These messages may be analyzed or parsed to determine context regarding the user (e.g., the user's expertise or interest in a topic may be determined based on the frequency of mention of the topic or key words associated with the topic within such messages). A sending user identifier may comprise ASCII text, a pointer, a memory address, and the like. An example sending user identifier is an author identifier in some embodiments discussed herein.

The term "group-based communication channel" refers to a virtual communications environment or feed that is configured to display messaging communications posted by channel members (e.g., validated users accessing the environment using client devices) that are viewable only to the members of the channel. In certain embodiments, the format of the group-based communication channel appears differently to different members of the group-based communication channel; however, the content of the group-based communication channel (i.e., messaging communications) will be displayed to each member of the group-based communication channel. For instance, in one embodiment, a common set of group-based messaging communications will be displayed to each member of the respective group-based communication channel such that the content of the group-based communication channel (i.e., messaging communications) will not vary per member of the group-based communication channel. However, in another embodiment, a member may join a group-based communication channel and only be able to view subsequent group-based messaging communications (as opposed to historical group-based messaging communications posted prior to the user joining the channel).

The group-based communication channels are generally topic-oriented, long-lasting channels as opposed to ad hoc ephemeral conversations in conventional messaging apps. Group-based communication channels are typically organized or arranged (e.g., alphabetically) in list form within a sidebar pane of the group-based communication interface based on the channel titles or names. The interface through which a member views a group-based communication channel is a "group-based communication channel interface".

The terms "group-based communication channel identifier" or "channel identifier" refer to one or more items of data by which a group-based communication channel is uniquely identified in a group-based communication system. For example, in some embodiments, a group-based communication channel identifier comprises ASCII text, a pointer, a memory address, and/or other unique identifier.

The term "group-based communication thread" or "thread" is a collection of message communications displayed in a subsidiary feed arising from or otherwise associated with a selected group-based messaging communication displayed in a selected group-based communication channel. A group-based communication thread may include one or more "threaded messages" or "thread communication messages" that are linked together in the subsidiary feed, wherein each is associated with the selected group-based messaging communication or "parent message."

The term "private group-based communication channel" refers to a group-based communication channel with restricted access settings such that it is not generally accessible and/or searchable by other members of the group-based communication system (i.e., members associated with other group-based communication workspaces). For example, only those users or administrators who have knowledge of and permission to access (e.g., a group-based communication channel identifier for the private group-based communication channel is associated with their user profile after the user has been validated/authenticated) the private group-based communication channel can view content of the private group-based communication channel.

The term "group-based caching service" refers to geographically-distributed computing devices configured for providing an interface enabling efficient network communications between the individual client devices and respective group-based communication servers (e.g., gateway servers) within a group-based communication system. In certain embodiments, a single group-based caching service interacts with all of the servers within a subset of group-based communication servers servicing a particular group-based communication channel or set of group-based communication channels. The group-based caching service provides lower latency associated with client device requests (i.e., requests by the client device to update or render a particular group-based communication interface) as well as a reduction in network traffic because the group-based caching service reduces the number of requests transmitted to group-based communication servers.

Group-based caching services structured as described herein enable amortization of fetches of group-based communication data over time. For example, as opposed to long, computationally intense periods of group-based communication data fetching upon startup, the present embodiments enable brief, light moments of group-based communication data fetching across the duration of a group-based communication interface session. Such amortization provides easier understanding of data service capacity management and lessens a group-based communication platform's risk of outages due to reconnect storms.

Group-based caching services structured as described herein are further configured to fetch and maintain group-based communication data sufficient to service expected client requests during any given group-based communication interface session or series of sessions. For example, in one embodiment, a group-based caching service may be configured to fetch and cache group-based communication data sufficient for rendering group-based communication messages for the preceding ten days (or some similar period) to a particular group-based communication channel or set of channels. In this way, the group-based caching service is configured to support most expected group-based communication interface sessions without requiring a subscribing client device to query the group-based communication server for additional data to support routine or expected group-based communication interface interactions.

In another embodiment, a group-based caching service may be configured to fetch and cache only metadata (e.g., user profile information, channel profile information (name, topic, created by etc.), channel membership information (list of people and bots in the channel)) associated with a group-based communication interface, group-based communication channel, set of group-based communication channels, workspace, files, or the like that covers some preceding access period (i.e., the preceding ten days). Client devices are configured to compare their respective local cache metadata to that stored to the group-based caching service and thereby are configured to request updates from the group-based communication server only for those portions their local cache that are determined to be out of date.

The term "communication apparatus" refers to a device, server, or other computing hardware component that is configured to manage user identification queries. In one embodiment, a communication apparatus is a specially configured group-based caching service having a user identification module that is configured to manage user identification queries originating from one or more client devices in a group-based communication system.

The term "user identification query" refers to an electronic data request generated by a client device (e.g., by a group-based communication app running on a mobile device) and provided to a user identification module (e.g., a user identification module operating within a group-based caching service). The user identification query includes a requesting user identifier and a target user identifier. The user identification query prompts a communication apparatus (e.g., a user identification module of a group-based caching service) to compare the target user identifier to a user status cache associated with the requesting user identifier to determine one of a known status, an unknown status, or a pending status for the target user identifier.

The term "requesting user identifier" refers to one or more items of data by which an operating user or an operating user profile may be identified by the group-based communication system. All user identification queries are resolved based on the perspective of the requesting user identifier. It is from this perspective that the communication apparatus determines if target user identifiers are associated known or unknown users. A requesting user identifier may be embodied by American Standard Code for Information Interchange (ASCII) text, a pointer, a memory address, or other unique identifier.

The term "target user identifier" refers to one or more items of data by which a user other than the operating user or a profile other than the operating user's profile (referred to herein as a targeted user or a targeted user's profile) is identified. A target user identifier is used by the communication apparatus to cause rendering of a known user identification interface to a group-based communication interface in response to the communication apparatus determining a known status for the target user identifier. A target user identifier is also used by the communication apparatus to cause rendering of a limited user identification interface to a group-based communication interface in response to the communication apparatus determining an unknown status for the target user identifier. A target user identifier may be embodied as American Standard Code for Information Interchange (ASCII) text, a pointer, a memory address, or other unique identifier.

The term "known status" refers to a system designation assigned to a target user identifier in circumstances where an authenticated or validated system relationship exists between an operating user and a targeted user. For example, a target user identifier associated with a validated member of operating user's group (i.e., the target user identifier and the requesting user identifier are associated with a common group identifier) is designated by the communication apparatus as having a known status.

The term "unknown status" refers to a system designation assigned to a target user identifier in circumstances where no authenticated or validated system relationship exists between an operating user and a targeted user. For example, a target user identifier associated with a targeted user that is not a validated member of the operating user's group (i.e., the target user identifier and the requesting user identifier are not associated with a common group identifier) may be designated by the communication apparatus as having an unknown status. This may occur, for example, in circumstances where a group-based communication interface includes group-based communication channels having messages involving multiple participating groups or organization identifiers (referred to herein as externally-shared channels). Said differently, members of such "externally shared" group-based communication channels include messages from channel members having different organization identifiers but common channel identifiers. This can occur, for example, in circumstances where a member of an outside organization (e.g., ACME Corp.) is invited to join a group-based communication channel of a host organization (e.g., Slack Corp.).

The term "pending status" refers to a system designation assigned to a target user identifier in circumstances where a system relationship (e.g., validated/known or not validated/unknown) has yet to be determined or when such determination is in process. For example, a target user identifier associated a targeted user that is not a validated member of the operating user's group (i.e., the target user identifier and the requesting user identifier are not associated with a common group identifier) may be designated by the communication apparatus as having a pending status. This may occur, for example, in circumstances such as those mentioned above where a group-based communication interface includes group-based communication channels having messages involving multiple participating groups or organization identifiers (referred to herein as externally-shared channels).

The term "limited user identification interface" refers to a graphical user interface (GUI) component, modal, or window that is rendered to a group-based communication interface and represents a non-validated user (i.e., a targeted user) when considered from the perspective of a requesting user. The limited user identification interface is configured to exclude private, sensitive, or internal information drawn from a targeted user's profile given that the targeted user has not been validated or authenticated for the requesting user, which is the intended viewer of the group-based communication interface comprising the limited user identification interface. In embodiments, a limited user identification interface includes: (1) an avatar or image, (2) a full name, username, display name or combination thereof, and (3) an indication of online presence.

The term "known user identification interface" refers to a GUI component, modal, or window that is rendered to a group-based communication interface and represents a validated user (i.e., a targeted user) when considered from the perspective of a requesting user. The known user identification interface is configured to include private, sensitive, or internal information drawn from a targeted user's profile given that the targeted user has been validated or authenticated for the requesting user, which is the intended viewer of the group-based communication interface comprising the known user identification interface. In some embodiments, a known user identification includes all user profile fields associated with a limited user identification interface and custom profile fields, targeted user location information, custom status(es), calendar information, supervisor information, channel engagement history information, and the like.

The term "client device hold instruction" refers to an electronic/computer command or control signal that is generated by a communication apparatus (e.g., a user identification module) in response to determining a pending status upon comparing a target user identifier to a user status cache associated with a requesting user identifier. The client device hold instruction is transmitted to a client device that originated the user identification query associated with the requesting user identifier to cause the client device to forgo further target user identifier associated queries of the group-based caching service or the group-based communication server for at least a hold period or until the communication apparatus can return one of a resolved known status or a resolved unknown status for the target user identifier to the requesting client device.

The term "limited user identification object" refers to electronic data and instructions that are retrieved from a group-based communication repository in response to the communication apparatus determining an unknown status for the target user identifier when considered with respect to the requesting user identifier. The limited user identification object is retrieved by the communication apparatus (e.g., the user identification module) and transmitted to the client device associated with the requesting user identifier for use in rendering the limited user identification interface. Put simply, the limited user identification object includes the data and instructions needed for the client device to render the limited user identification interface to the group-based communication interface.

The term "known user identification object" refers to electronic data and instructions that are retrieved from a group-based communication repository in response to the communication apparatus determining a known status for the target user identifier when considered with respect to the requesting user identifier. The known user identification object is retrieved by the communication apparatus (e.g., the user identification module) and transmitted to the client device associated with the requesting user identifier for use in rendering the known user identification interface. Put simply, the known user identification object includes the data and instructions needed for the client device to render the known user identification interface to the group-based communication interface.

The term "group-based communication repository" refers to a computing location, such as a memory device, where data is stored, accessed, modified and otherwise maintained by the group-based communication system. The stored data includes information that facilitates the operation of the group-based communication system. The group-based communication repository may be embodied as a data storage device or devices, as a separate database server or servers, or as a combination of data storage devices and separate database servers. The group-based communication repository may be a dedicated device and/or a part of a larger repository. In embodiments, the group-based communication repository contains at least limited user identification objects associated with target user identifiers. In other embodiments, the group-based communication repository contains known user identification objects associated with target user identifiers.

The term "group connection array" refers to a database or repository of a group-based communication system that is accessible to a group-based communication server that stores associations, links, and/or priority scores between and among users (e.g., user identifiers) of various groups (i.e., team and/or organizations) known to the group-based communication system. The group connection array may be embodied as a social graph and/or network graph based on user profile information (e.g., user work location, user organization information, organization identifier, user role information, etc.) and user interactions occurring via group-based communication interfaces of the group-based communication system. Such interactions may include organization or group membership data, channel membership data, channel engagement data, file engagement data, and the like. In embodiments where the group connection array is assembled as a work graph data structure, the group connection array may be leveraged via machine-learning and/or artificial-intelligence configurations and/or models to generate resolved known status or resolved unknown status determinations for a given requesting user identifier and target user identifier pair.

In other embodiments, the group connection array may be a table whereby group-to-group connections are stored. For example, assuming groups A-N are known to the group-based communication system, the group connection array would include a "connected" or "disconnected" status for each group (i.e., group A) relative to every other group (i.e., groups B through N).

The term "resolved known status" refers to a second system designation assigned to a target user identifier following a first "pending status" system designation for the target user identifier in circumstances where the communication apparatus determines an authenticated or validated system relationship exists between an operating user and a targeted user based on querying the group connection array. For example, a target user identifier associated with a targeted user that is not a member of operating user's group (i.e., the target user identifier and the requesting user identifier are not associated with a common group identifier) but with whom the operating user has previously sent direct messaging communications may be deemed sufficiently validated to be designated under a resolved known status.

The term "resolved unknown status" refers to a second system designation assigned to a target user identifier following a first "pending status" system designation for the target user identifier in circumstances where the communication apparatus determines that no authenticated or validated system relationship exists between an operating user and a targeted user based on querying the group connection array. For example, a target user identifier associated with a targeted user that is not a member of operating user's group (i.e., the target user identifier and the requesting user identifier are not associated with a common group identifier) and with whom the operating user has not previously interacted (e.g., no prior direction messaging communications, no common group-based communication channel memberships, etc.) may be deemed sufficiently non-validated to be designated under a resolved unknown status. For example, the group connection array may indicate that the group A associated with the requesting user identifier is disconnected relative to group B associated with the target user identifier.

The term "user status cache" refers to a database or repository accessible to a group-based caching service that is configured for storing system status designations such as: known status, unknown status, pending status, resolved known status, and resolved unknown status for each requesting user identifier and target user identifier pair.

As used herein, the terms "data," "content," "digital content," "digital content object," "information," and similar terms are used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, repeaters, and/or the like, sometimes referred to herein as a "network." Similarly, where a computing device is described herein to send data to another computing device, it will be appreciated that the data may be transmitted directly to another computing device or may be transmitted indirectly via one or more intermediary computing devices, such as, for example, one or more servers, relays, routers, network access points, base stations, hosts, repeaters, and/or the like.

The term "user" should be understood to refer to an individual that is credentialed to access at least one group-based communication interface of a group-based communication system. Users referred to herein are discussed largely in connection with client device enabled activity for accessing a group-based communication interface (or set of group-based communication interfaces) of a group-based communication system. That is, in some embodiments, users access a group-based communication messaging system using client devices. Each user of the group-based communication system is associated with at least one "group identifier".

The terms "user profile," "user account," "user profile data," and "user account details" refer to data, files, and other information of a group-based communication system that is associated with a user, including, for example, a user identifier, one or more group-based communication channel identifiers associated with group-based communication channels to which the user has been granted access, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., jdoe), a password, a time zone, a status, and the like. The user account details can include a subset designation of user credentials, such as, for example, login information for the user including the user's username and password.

The term "client device" refers to computer hardware and/or software that is configured to access a service made available by a server. The server is often (but not always) on another computer system, in which case the client device accesses the service by way of a network. Client devices include, without limitation, smart phones, tablet computers, laptop computers, wearables, personal computers, enterprise computers, and the like. In some embodiments, client devices are associated with a user and/or a particular organization. In certain embodiments, the association is created by the client device transmitting registration information for the user to the group-based communication server. In some instances, a client device is temporarily associated with a user (e.g., only when a user is logged onto the group-based communication system app).

The term "user engagement" refers to user interaction, via a graphical user interface (i.e., the group-based communication interface), with the group-based communication system or components thereof. Such user engagement with the group-based communication interface or components thereof can be via a multitude of interactions, such as, but not limited to, "non-keystroke engagement" or "keystroke engagement." Non-keystroke engagement refers to user interaction in which such user interaction is free from (i.e., excludes) the entering of one or more (e.g., keystroke) characters into a group-based communication interface. For example, touch-screen or mouse click engagement are examples of non-keystroke engagement. The term "keystroke engagement" refers to entering of one or more keystrokes into a component of the group-based communication interface. For example, input of one or more characters (e.g., alphanumeric characters or emojis) into a component of the group-based communication interface is one example of keystroke engagement.

The term "user identifier" refers to one or more items of data by which a user, a user profile, or the user's corresponding user account is uniquely identified within a group-based communication system. For example, a user identifier comprises American Standard Code for Information Interchange (ASCII) text, a pointer, a memory address, or other unique identifier.

The terms "group identifier," "workspace identifier," and "team identifier" refer to one or more items of data by which a group-based communication workspace within a group-based communication system is uniquely identified. For example, a group identifier comprises ASCII text, a pointer, a memory address, or other unique identifier. Group identifiers are used to distinguish group-based communication channels, messages, files, members, etc., associated with one group-based communication workspace from another group-based communication workspace.

The term "organization identifier" refers to one or more items of data by which an organization or users associated with an organization within a group-based communication system is uniquely identified. For example, in some embodiments, an organization identifier comprises ASCII text, a pointer, a memory address, and/or other unique identifier. In some embodiments, the organization identifier is associated with a select group of users, such as a group of employees of a business, enterprise, corporation, or organization (e.g., the organization identifier associated with Slack Corp. employees would be different than the organization identifier associated with ACME Corporation). The group-based communication workspaces and channels associated with Slack Corp.'s organization identifier would not be accessible or viewable by users associated with the ACME Corporation organization identifier. In certain embodiments, the organization identifier is associated with a plurality of group-based communication workspaces (e.g., a marketing group, a sales group, a patent group, etc.), which are defined herein.

The term "external resource" or "external application" refers to a software program, application, platform, or service that is configured to communicate with the group-based communication system for providing an external service (i.e., not native to the group-based communication system) to a client device via a group-based communication interface and/or via a group-based communication workspace. The external application may service, manage, and/or perform various functions that are accessible to a user. The external application operates on a compiled code base or repository that is separate and distinct from that which supports the group-based communication system. In some embodiments, external applications communicate with the group-based communication system, and vice versa, through one or more application program interfaces (APIs). As various examples, an external application may be configured for executing a calendaring/scheduling app, a to-do list app, a service provider app, a code building app, a software testing app, a storage repository app, and/or the like. In some embodiments, an external application is configured to perform or execute an operational sequence step associated with an operational sequence set initialized in the group-based communication system.

The term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase is included in the at least one embodiment of the present invention and may be included in more than one embodiment of the present invention (importantly, such phrases do not necessarily refer to the same embodiment).

The terms "illustrative," "example," "exemplary" and the like are used herein to mean "serving as an example, instance, or illustration" with no indication of quality level. Any implementation described herein as "exemplary" is not necessarily to be construed as preferred or advantageous over other implementations.

The terms "about," "approximately," or the like, when used with a number, may mean that specific number, or alternatively, a range in proximity to the specific number, as understood by persons of skill in the art field.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The term "set" refers to a collection of one or more items.

The term "plurality" refers to two or more items.

The term "or" is used herein in both the alternative and conjunctive sense, unless otherwise indicated.

Example System Architecture

Methods, apparatuses, and computer program products of the present disclosure may be embodied by any of a variety of devices. For example, the method, apparatus, and computer program product of an example embodiment may be embodied by a networked device (e.g., a group-based caching service), such as a server or other network entity, configured to communicate with one or more devices, such as one or more client devices and one or more group-based communication servers. Additionally, or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example group-based communication network architecture 100 structured according to embodiments of the present disclosure. The depicted group-based communication network architecture 100 includes a group-based communication system 102, a group-based caching service 104, a plurality of client devices 108A-108F, and a plurality of external resources all communicating via a communications network 106.

The depicted group-based communication system 102 comprises a group-based communication server 200 in communication with at least one group-based communication repository 103 and at least one group connection array 105.

Users access the group-based communication system 102 via the communications network 106 using client devices 108A-108F. The depicted client devices 108A-108F are associated with users from two different organizations. Client devices 108A-108C are associated with users from Organization A (e.g., Slack Corporation) and client devices 108D-108F are associated with users from Organization B (e.g., ACME Corporation). Organizations A and B are represented schematically in FIG. 1 by broken lines.

Users associated with client devices 108C and 108D have been validated by the group-based communication system for membership in an externally shared channel. For example, Organization A may have created a group-based communication channel focused on payroll issues (i.e., #HR-payroll-issues) in its human resources group-based communication workspace and invited a user associated with client device 108D from its payroll service vendor, Organization B, to join. The externally shared channel membership for client devices 108C and 108D is illustrated schematically in FIG. 1 by dotted lines.

Communications network 106 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 106 may include a cellular telephone, an 802.11, 802.16, 802.20, and/or WiMax network. Further, the communications network 106 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JSON (JavaScript Object Notation) objects sent via a Websocket channel. In some embodiments, the protocol is JSON over RPC ("remote procedural call), JSON over REST ("Representational State Transfer")/HTTP ("HyperText Transfer Protocol"), and the like.

The group-based communication server 200 may be embodied as a computer or computers. The group-based communication server 200 provides for receiving of electronic data from various sources, including but not necessarily limited to the client devices 108A-108F and the group-based caching service 104.

The group-based communication repository 103 may be embodied as a data storage device(s) such as a Network Attached Storage (NAS) device or devices, or as a separate database server or servers. The group-based communication repository 103 includes information accessed and stored by the group-based communication server 200 and/or the group-based caching service 104 to facilitate operations of the group-based communication system 102. For example, the group-based communication repository 103 may include, without limitation, a plurality of user identification objects (e.g., known user identification objects, limited user identification objects). The group-based communication repository also includes, without limitation, a plurality of messaging communications organized among a plurality of group-based communication channels, and/or the like.

The group connection array 105 may be embodied as a data storage device(s) such as a Network Attached Storage (NAS) device or devices, or as a separate database server or servers. The group connection array 105 includes information accessed and stored by the group-based communication server 200 and/or the group-based caching service 104 to facilitate operations of the group-based communication system 102. For example, the group connection array 105 stores associations, links, and/or priority scores between and among users (e.g., user identifiers) of the group-based communication system 102.

The depicted group-based communication network architecture 100 further includes a group-based caching service 104. The group-based caching service 104 may be embodied as a computer or computers. The depicted group-based caching service 104 is configured to provide an interface enabling efficient network communications between individual client devices 108A-108F and one or more group-based communication servers 200. The depicted group-based caching service 104 includes a user identification module 116 and is disposed in communication with at least one user status cache 107. In one embodiment, the group-based caching service 104 may be embodied by one or more of the load balancers, edge cache host, gateway server, and status checker described in commonly owned U.S. patent application Ser. No. 15/983,674 filed May 18, 2018 and is entitled Method, Apparatus, and Computer Program Product for a Scalable Group-Based Communication System with a Reduced Client Memory Footprint. The contents of such commonly owned patent application are hereby incorporated by reference in their entirety. While various embodiments discussed herein illustrate the group-based caching service as an edge cache, other caching systems may be used in connection with the inventive concepts herein described as will be apparent to one of ordinary skill in the art.

The user status cache 107 may be embodied as a data storage device(s) such as a Network Attached Storage (NAS) device or devices, or as a separate database server or servers. The user status cache 107 includes information accessed and stored by the group-based caching service 104 to facilitate the operations of the group-based communication system 102. For example, the user status cache 107 stores, without limitation, a plurality of user specific system status designations.

The client devices 108A-108F may be any computing device as defined above. Electronic data received by the group-based communication server 200 from the client devices 108A-108F may be provided in various forms and via various methods. For example, the client devices 108A-108F may include desktop computers, laptop computers, smartphones, netbooks, tablet computers, wearables, and the like.

In embodiments where a client device 108A-108F is a mobile device, such as a smart phone or tablet, the client device 108A-108F may execute an "app" (e.g., a group-based communication application as defined above) to interact with the group-based communication system 102 and the group-based caching service 104. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally or alternatively, the client device 108A-108F may interact with the group-based communication system 102 and group-based caching service 104 via a web browser. As yet another example, the client device 108A-108F may include various hardware or firmware designed to interface with the group-based communication system 102 and the group-based caching service 104.

In some embodiments of an exemplary group-based communication system 102, a message or messaging communication may be sent from a client device 108A-108F to the group-based communication system 102. In various implementations, the message may be sent to the group-based communication system 102 over communications network 106 directly by a client device 108A-108F, the message may be sent to the group-based communication system 102 via an intermediary such as a message server (not shown), and/or the like. For example, the client device 108A-108F may be a desktop, a laptop, a tablet, a smartphone, and/or the like that is executing a client application (e.g., a group-based communication application). In one implementation, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), a thread identifier, third party metadata, and/or the like. In one embodiment, the client device 108A-108F may provide the following example message, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>ID_user_1</user_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
            //it should be noted that although several client details
            //sections are provided to show example variants of client
            //sources, further messages will include only one to save
            //space
        <client_IP>10.0.0.123</client_IP>
        <user_agent_string>Mozilla/5.0 (iPhone; CPU iPhone OS 7_1_1 like Mac OS
X) AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
    <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>MSM.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac OS
X) AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
    <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus S
Build/IMM76D) AppleWebKit/534.30 (KHTML, like Gecko) Version/4.0 Mobile
```

```
Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-
XXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-
XXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <message>
        <message_identifier>ID_message_10</message_identifier>
        <team_identifier>ID_team_1</team_identifier>
        <channel_identifier>ID_channel_1</channel_identifier>
        <contents>That is an interesting invention. I have attached a copy our patent
policy.</contents>
        <attachments>patent_policy.pdf</attachments>
    </message>
</auth_request>
```

The group-based communication system 102 comprises at least one group-based communication server 200 that may create a storage message based upon the received message to facilitate message indexing and storage in a group-based communication repository 103. In one implementation, the storage message may include data such as a message identifier, a group identifier, a group-based communication channel identifier, a sending user identifier, topics, responses, message contents, attachments, message hierarchy data, a thread identifier, third party metadata, conversation primitive data, and/or the like. For example, the group-based communication server 200 may provide the following example storage message, substantially in the form of a HTTP(S) POST message including XML-formatted data, as provided below:

```
POST /storage_message.php HTTP/1.1
Host: www.server.com
Content-Type: Application/XML
Content-Length: 667
<?XML version = "1.0" encoding = "UTF-8"?>
<storage_message>
    <message_identifier>ID_message_10</message_identifier>
    <team_identifier>ID_team_1</team_identifier>
    <channel_identifier>ID_channel_1</channel_identifier>
    <sending_user_identifier>ID_user_1</sending_user_identifier>
    <topics>
        <topic>inventions</topic>
        <topic>patents</topic>
        <topic>policies</topic>
    </topics>
    <responses>
        <response>liked by ID_user_2</response>
        <response>starred by ID_user_3</response>
    </responses>
    <contents>That is an interesting invention. I have attached a copy
```

```
our patent policy.</contents>
        <attachments>patent_policy.pdf</attachments>
        <conversation_primitive>
            conversation includes messages: ID_message_8,
ID_message_9, ID_message_10,
            ID_message_11, ID_message_12
        </conversation_primitive>
</storage_message>
```

In embodiments, a group-based communication channel identifier as defined above may be associated with the message. In embodiments, a sending user identifier as defined above may be associated with the message. In one implementation, the message may be parsed (e.g., using PHP commands) to determine a sending user identifier of the user who sent or posted the message to the group-based communication interface. In some embodiments, such sending user identifiers may correlate to target user identifiers in circumstances where an operating user is intending to view a series of messages posted by another user. Embodiments of the present invention would parse each message (e.g., using PHP commands) to identifier mentioned users (e.g., those @mentioned users) within the messages and those sending users as possible sources of target user identifiers for user identification queries as discussed in greater detail below.

In embodiments, topics may be associated with the message. In one implementation, the message contents may be parsed (e.g., using PHP commands) to determine topics discussed in the message. For example, hashtags in the message may indicate topics associated with the message. In another example, the message may be analyzed (e.g., by itself, with other messages in a conversation primitive) or parsed using a machine learning technique, such as topic modeling, to determine topics associated with the message.

In embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:

```
SELECT messageResponses
FROM MSM_Message
WHERE messageID = ID_message_10.
```

For example, data regarding responses to the message may be used to determine context for the message (e.g., a social score for the message from the perspective of an operating user). In another example, data regarding responses to the message may be analyzed to determine context regarding the user (e.g., the user's expertise in a topic may be determined based on the responses to the user's message regarding the topic).

In embodiments, attachments may be included with the message. If there are attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In embodiments, third party metadata may be associated with the message. For example, third party metadata may provide additional context regarding the message or the user that is specific to a company, group, group-based communication channel, and/or the like. In one implementation, the message may be parsed (e.g., using PHP commands) to determine third party metadata.

In embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the group-based communication channel) and/or proximity (e.g., message send order proximity, message send time proximity) of the messages.

In embodiments, various metadata, determined as described above, and/or the contents of the message may be used to index the message (e.g., using the conversation primitive) to facilitate various facets of searching (i.e., search queries that return results from group-based communication repository 103). In one implementation, a storage message may be sent from group-based communication server 200 to facilitate indexing in group-based communication repository 103. In another implementation, metadata associated with the message may be determined and the message may be indexed in group-based communication repository 103. In one embodiment, the message may be indexed such that a company's or a group's messages are indexed separately (e.g., in a separate index associated with the group and/or company that is not shared with other groups and/or companies). In one implementation, messages may be indexed at a separate distributed repository (e.g., to facilitate data isolation for security purposes).

If there are attachments associated with the message, file contents of the associated files may be used to index such files in group-based communication repository 103 to facilitate searching. In one embodiment, the files may be indexed such that a company's or a group's files are indexed at a separate distributed repository.

Example Apparatus for Implementing Embodiments of the Present Disclosure

Example Group-Based Communication Server

The group-based communication server 200 may be embodied by one or more computing systems, such as group-based communication server 200 shown in FIG. 2A. The group-based communication server 200 may include a processor 202, a memory 201, input/output circuitry 203, communications circuitry 205, and group-based communication circuitry 209. The group-based communication server 200 may be configured, using one or more of the circuitries 203, 205, or 209, to execute the operations described herein.

Although the components are described with respect to functional limitations, it should be understood that the particular implementations necessarily include the use of particular hardware. It should also be understood that certain of the components described herein may include similar or common hardware. For example, two sets of circuitries may both leverage use of the same processor, network interface, storage medium, or the like to perform their associated functions, such that duplicate hardware is not required for each set of circuitries. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the group-based service 210 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or coprocessor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the group-based communication server 200 to carry out various functions in accordance with example embodiments of the present disclosure.

The processor 202 may be embodied in a number of different ways and may, for example, include one or more processing devices configured to perform independently. Additionally, or alternatively, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor 202 may be configured to execute hard-coded functionality. As such, whether configured by hardware or software methods, or by a combination thereof, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure the processor 202 to perform the algorithms and/or operations described herein when the instructions are executed.

As just one example, the processor 202 may be configured to maintain one or more group-based communication channels connecting a plurality of client devices 108A-108F (shown in FIG. 1) to enable message sharing therebetween. The processor 202 ensures that messages intended for exchange between the client devices 108A-108F within the particular communication channel are properly disseminated to those client devices 108A-108F for display within respective display windows provided via the client devices 108A-108F.

Moreover, the processor 202 may be configured to synchronize messages exchanged on a particular group-based communication channel with a database (e.g., a group-based communication repository) for storage and/or indexing of messages therein. In certain embodiments, the processor 202 may provide stored and/or indexed messages for dissemination to client devices 108A-108F. The processor 202 may also provide to distribute such stored and/or indexed messages across various group-based communication workspaces and associated group-based communication channels as discussed herein.

In some embodiments, the group-based communication server 200 may include input/output circuitry 203 that may, in turn, be in communication with processor 202 to provide output to the user and, in some embodiments, to receive an indication of a user input. The input/output circuitry 203 may comprise a user interface (e.g., a group-based communication interface) and may include a display and may comprise a web user interface, a mobile application, a client device, or the like. In some embodiments, the input/output circuitry 203 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 201, and/or the like).

The communications circuitry 205 may be any means such as a device or circuitry embodied in either hardware or a combination of hardware and software that is configured to receive and/or transmit data from/to a network and/or any other device, circuitry, or module in communication with the group-based communication server 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s).

Example Group-Based Caching Service

The group-based caching service 104 may be embodied by one or more computing systems, such as group-based caching service 210 shown in FIG. 2B. The group-based caching service 210 may include a processor 212, a memory 211, input/output circuitry 213, group-based caching service circuitry 214, communications circuitry 215, and user identification module circuitry 216.

In some embodiments, the processor 212 (and/or coprocessor or any other processing circuitry assisting or otherwise associated with the processor) may be in communication with the memory 211 via a bus for passing information among components of the group-based caching service 210. The memory 211 may be non-transitory and may include, for example, one or more volatile and/or non-volatile memories. In other words, for example, the memory may be an electronic storage device (e.g., a computer readable storage medium). The memory 211 may be configured to store information, data, content, applications, instructions, or the like, for enabling the group-based caching service 210 to carry out various functions in accordance with example embodiments of the present disclosure.

The processor 212 may be embodied in a number of different ways and may, for example, include one or more processing devices configured to perform independently. Additionally, or alternatively, the processor 212 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 212 may be configured to execute instructions stored in the memory 211 or otherwise accessible to the processor 212. Alternatively, or additionally, the processor 212 may be configured to execute hard-coded functionality. As such, whether configured by hardware or software methods, or by a combination thereof, the processor 212 may represent an entity (e.g., physically embodied in circuitry) capable of performing operations according to an embodiment of the present disclosure while configured accordingly. Alternatively, as another example, when the processor 212 is embodied as an executor of software instructions, the instructions may specifically configure the processor 202 to perform the algorithms and/or operations described herein when the instructions are executed.

As just one example, the processor 212 may be configured to retrieve a plurality of user identification queries from client devices 108A-108F (shown in FIG. 1) to enable resolution thereof. The processor 212 ensures that user status determinations intended for particular client devices 108A-108F are properly disseminated to those client devices 108A-108F for rendering of group-based communication interfaces displayed within respective display windows provided via the client devices 108A-108F. More particularly, in some embodiments, the user status determinations are disseminated so that one of a known user identification interface or a limited user identification interface is rendered to group-based communication interfaces displayed to display windows of the client devices 108A-108F.

The depicted group-based caching service 210 includes input/output circuitry 213 that may, in turn, be in communication with processor 212 to provide output to the user and, in some embodiments, to receive an indication of a user input. The input/output circuitry 213 may comprise a user interface (e.g., a group-based communication interface) and may include a display and may comprise a web user interface, a mobile application, a client device, or the like. In some embodiments, the input/output circuitry 213 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 211, and/or the like).

The communications circuitry 215 may be any means such as a device or circuitry embodied in either hardware or a combination of hardware and software that is configured to receive and/or transmit data from/to a network and/or any other device, circuitry, or module in communication with the group-based caching service 210. In this regard, the communications circuitry 215 may include, for example, a network interface for enabling communications with a wired or wireless communication network. For example, the communications circuitry 215 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s).

The user identification module circuitry 216 may be any means such as a device or circuitry combined in either hardware or a combination of hardware and software that is configured to receive user identification queries, compare target user identifiers to a user status cache, transmit client hold instructions, cause comparison of target user identifiers to a group connection array, and determine for any target user identifier any one of a known status, an unknown status, a pending status, a resolved known status, or a resolved unknown status. The user identification module circuitry is further configured to cause rendering at requesting client devices group-based communication interfaces comprising known user status interfaces and/or limited user status interfaces. The user identification circuitry 216 is further configured to communication with network 106 (shown in FIG. 1), group-based communication system 102 (shown in FIG. 1), and client devices 108A-108F (shown in FIG. 1) to perform the operations attributable to the communication apparatus, the user identification module 116 (shown in FIG. 1), and the group-based caching service 210 discussed herein.

The group-based caching service circuitry 214 may be any means such as a device or circuitry combined in either hardware or a combination of hardware and software that is configured to provide a low latency caching service for client devices network communications in support of servicing group-based communication interfaces rendered to such client devices. The group-based caching circuitry may be embodied by one or more of the group-based communication load balancing circuitry, group-based communication edge cache circuitry, group-based communication gateway circuitry, and group-based communication status checker circuitry described in commonly owned U.S. patent application Ser. No. 15/983,674 filed May 18, 2018 and is entitled Method, Apparatus, and Computer Program Product for a Scalable Group-Based Communication System with a Reduced Client Memory Footprint. The contents of such commonly owned patent application are hereby incorporated by reference in their entirety.

Example Client Device

The client devices 108A-108F may be embodied by one or more computing components, such as client device 220 shown in FIG. 2C. The client device 220 may be any computing device as defined above. The depicted client device 220 includes a processor 222, a memory 221, input/output circuitry 223, communications circuitry 225, and a group-based communication app 226.

In some embodiments, the processor 222 (and/or co-processor or any other processing circuitry assisting or otherwise associated with the processor) may be in communication with the memory 221 via a bus for passing information among components of the apparatus. The memory 221 may be non-transitory and may include, for example, one or more volatile and/or non-volatile memories. In other words, for example, the memory may be an electronic storage device (e.g., a computer readable storage medium). The memory 221 may be configured to store information, data, content, applications, instructions, or the like, for enabling the client device 220 to carry out various functions in accordance with example embodiments of the present disclosure.

The processor 222 may be embodied in a number of different ways and may, for example, include one or more processing devices configured to perform independently. Additionally, or alternatively, the processor 222 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 222 may be configured to execute instructions stored in the memory 221 or otherwise accessible to the processor. Alternatively, or additionally, the processor 222 may be configured to execute hard-coded functionality. As such, whether configured by hardware or software methods, or by a combination thereof, the processor 222 may represent an entity (e.g., physically embodied in circuitry) capable of performing operations according to an embodiment of the present disclosure while configured accordingly. Alternatively, as another example, when the processor 222 is embodied as an executor of software instructions, the instructions may specifically configure the processor 222 to perform the algorithms and/or operations described herein when the instructions are executed.

As just one example, the processor 222 may be configured to provide a plurality of user identification queries from client devices 108A-108F (shown in FIG. 1) to enable resolution thereof.

The communications circuitry 225 may be any means such as a device or circuitry embodied in either hardware or a combination of hardware and software that is configured to receive and/or transmit data from/to a network and/or any other device, circuitry, or module in communication with the group-based caching service 210. In this regard, the communications circuitry 225 may include, for example, a network interface for enabling communications with a wired or wireless communication network. For example, the communications circuitry 225 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s).

Electronic data retrieved by the group-based communication server 200 and/or the group-based caching service 210 from the client devices 220 may be provided in various forms and via various methods. For example, the client devices 220 may include desktop computers, laptop computers, smartphones, netbooks, tablet computers, wearables, and the like.

In embodiments where a client device 220 is a mobile device, such as a smartphone or tablet, the client device 220 may execute a "group-based communication app" 226 to interact with the group-based communication system 102 (shown in FIG. 1). Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally, or alternatively, the client device 220 may interact with the group-based communication system 102 via a web browser. As yet another example, the client device 220 may include various hardware or firmware designed to interface with the group-based communication system 102.

In the depicted embodiment, the client device 220 is configured, via the processor and using data and instructions provided by the group-based communication app 226, to generate one or more user identification queries for transmission to the user identification module 116 (shown in FIG. 1) of the group-based caching service 104 (shown in FIG. 1). In various implementations, the user identification queries may be provided to the group-based caching service 104 over communications network 106 directly by a client device 220, or the user identification query may be sent to the group-based communication system 102 via an intermediary such as a message server (now shown), and/or the like.

In one implementation, the user identification query includes data such as a requesting user identifier, a target user identifier, a group identifier, message contents (e.g., text, emojis, images, links), attachments (e.g., files), message hierarchy data (e.g., the message may be a reply to another message), third party metadata, and/or the like. The target user identifier may comprise a binary validity indicator defining an expected user status for the target user (e.g., a positive number for target users expected to have a known status and a negative number for target users expected to have an unknown status).

In embodiments, the client device 220 may provide the following example user identification query, substantially in the form of a (Secure) Hypertext Transfer Protocol ("HTTP(S)") POST message including JavaScript Object Notation ("JSON") formatted data, as provided below:

```
check_interaction: true,
updated_ids:      {
    W11111111: 0,
    W22222222: 155555555,
    W33333333: 15555555,
}
cannot_interact: [W33333333]
```

Notably, the above provided example user identification query actually includes two requests. The first request is intended to determine if the requesting user identifier is validated to interact with the target user identifier. The second request is intended for the client device to update its local profile and to fetch user profile information concerning the target user identifier that it does not have in its local cache.

In embodiments, the group-based caching service 104 (e.g., the user identification module 116) may provide the following example user status determination in response to a user identification query, substantially in the form of a (Secure) Hypertext Transfer Protocol ("HTTP(S)") POST message including eXtensible Markup Language ("XML") formatted data, as provided below:

```
results:   [ ],
failed ids: [ ], // For backwards compatibility
invalid_ids:     [ ],
pending_ids:    [ ],
can_interact:      {
    W11111111: true,
    W22222222: true,
    W33333333: false,
}
```

A client device 220 may comprise a display suitable for rendering group-based communication interfaces including known user identification interfaces and limited user identification interfaces. A display may be an output configured for presentation of information in visual and/or tactile form. This includes, but is not limited to, electronic visual displays such as active displays (e.g., LCD screens, watch faces and computer monitors, ELD, LED, OLED, QLED, TFT) and/or the like. For example, a display of a client device 220 may be configured in communication with input-output circuitry 223 to cause rendering of group-based communication interfaces comprising user identification interfaces such as those discussed above.

As described above and as will be appreciated based on this disclosure, embodiments of the present disclosure may be configured as methods, mobile devices, frontend graphical user interfaces, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

As will be appreciated, any such computer program instructions and/or other type of code may be loaded onto a computer, processor or other programmable apparatus's circuitry to produce a machine, such that the computer, processor, or other programmable circuitry that execute the code on the machine creates the means for implementing various functions, including those described herein.

The computing systems described herein can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Any operational step shown in broken lines in one or more flow diagrams illustrated herein are optional for purposes of the depicted embodiment.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

Example Operations

Having described the group-based communication apparatus and exemplary circuitry comprising embodiments of the present disclosure, it should be understood that the user identification module 116 (shown in FIG. 1) as an example communication apparatus may proceed to implement operational sequence sets within a group-based communication system in a number of ways.

FIG. 3A is a flowchart broadly illustrating a series of operations or process blocks of process 300 that are executed or performed to retrieve a user identification query associated with a group-based communication interface and compare the target user identifier to a user status cache associated with the requesting user identifier to determine one of a known status, an unknown status, or a pending status in accordance with one embodiment of the present disclosure.

In the embodiment illustrated in FIG. 3A, the depicted process begins at Block 302, which includes retrieving a user identification query associated with a group-based communication interface. Such user identification query may be generated by a group-based communication app running on a client device that is attempting to render a message posted by a target user within a group-based communication channel of a group-based communication interface. The user identification query comprises, inter alia, a requesting user identifier and a target user identifier. The requesting user identifier is associated with the operating user of the client device that is the intended view of the rendered group-based communication interface. The target user identifier is associated with the target user that posted the message of interest.

At Block 304, the depicted process 300 further includes comparing the target user identifier to a user status cache associated with the requesting user identifier to determine one of a known status, an unknown status, or a pending status for the target user identifier.

FIGS. 3B-1 through 3B-3 are signal diagrams of example data flows represented by method 300. That is, FIGS. 3B-1 through 3B-3 illustrate data flow interactions between a client device, a group-based caching service, and a user status cache when retrieving a user identification inquiry and comparing the target user identifier to a user status cache associated with the requesting user identifier to determine one of a known status, an unknown status, or a pending status for the target user identifier in accordance with one embodiment.

In the depicted example of FIG. 3B-1, method 300 is described as being performed by client device 108C, group-based caching service 104 (more particularly the user identification module 116 of the group-based caching service 104), and user status cache 107. As was noted above in connection with FIG. 1, client device 108C is associated with a user from Organization A (e.g., Slack Corporation) and client device 108D is associated with a user from Organization B (e.g., ACME Corporation). Users associated with client devices 108C and 108D have been validated by the group-based communication system for membership in an externally shared channel. For example, Organization A may have created a group-based communication channel focused on payroll issues (i.e., #HR-payroll-issues) in its human resources group-based communication workspace and invited a user associated with client device 108D from its payroll service vendor, Organization B, to join.

The term "validated" as referred to herein with respect to relationships between users in a group-based communication systems refers to circumstances where each respective user, e.g., users associated with client devices 108C and 108D, has been authenticated by the group-based communication system (e.g., through a member or guest profile registration process) and the respective users have agreed to share information or otherwise interact with one another by joining a common group-based communication channel, a common group-based communication workspace, or engaging in direct message communications via the group-based communication system.

The depicted group-based caching service 104 retrieves or receives a user identification query at operation 302 from client device 108C that is generated, for example, when a user associated with client device 108D posts a message to the #HR-payroll-issues group-based communication channel as shown in FIGS. 5C-1 through 5C-3 discussed below. The user identification module 116 of the group-based caching service 104 may then cause comparison of the target user identifier (i.e., the user identifier associated with the message posted by client device 108D) to a user status cache 107 associated with the requesting user identifier (i.e., the user identifier associated with client device 108C) at operation 304. As depicted in FIG. 3B-1, process 300 concludes with a determination by the user identification module 116 of group-based caching service 104 at operation 306 of a known status for the target user identifier. This stands to reason given that target user operating client device 108D has been validated by the group-based system for membership in the #HR-payroll-issues group-based communication channel and, thus, is "known" by the operating user of client device 108C.

In the depicted example of FIG. 3B-2, the depicted group-based caching service 104 retrieves or receives a user identification query at operation 302 from client device 108C that is generated, for example, when a user associated with client device 108D posts a message to the #HR-payroll-issues group-based communication channel that tags an Organization B coworker such as a user associated with client device 108E as shown in FIGS. 5C-1 and 5C-4 discussed below. The user identification module 116 of the group-based caching service 104 may then cause comparison of the target user identifier (i.e., the user identifier associated with the tagged coworker associated with client device 108E) to a user status cache 107 associated with the requesting user identifier (i.e., the user identifier associated with client device 108C) at operation 304. As depicted in FIG. 3B-2, process 300 may conclude with determination by user identification module 116 of group-based caching service 104 of an unknown status for the target user identifier at operation 308. This stands to reason given that target user operating client device 108E (i.e., the user mentioned in the message posted by the user associated with client device 108D) has not been validated by the group-based system for membership in the #HR-payroll-issues group-based communication channel and, thus, has been previously designated by the group-based communication system as "unknown" by the operating user of client device 108C.

In the depicted example of FIG. 3B-3, the depicted group-based caching service 104 retrieves or receives a user identification query at operation 302 from client device 108C that is generated, for example, when a user associated with client device 108D posts a message to the #HR-payroll-issues group-based communication channel that tags an Organization B coworker such as a user associated with client device 108F. The user identification module 116 of the group-based caching service 104 may then cause comparison of the target user identifier (i.e., the user identifier associated with the tagged coworker associated with client device 108F) to a user status cache 107 associated with the requesting user identifier (i.e., the user identifier associated with client device 108C) at operation 304. As depicted in FIG. 3B-3, process 300 may conclude with determination by user identification module 116 of group-based caching service 104 of a pending status for the target user identifier at operation 310. In this example, the pending status is determined because the user status cache 107 does not include a known or unknown system status designation for the target user identifier (e.g., the user associated with client device 108F) with respect to the requesting user identifier (e.g., the operating user associated with client device 108C). In some embodiments, user identification module 116 of group-based caching service 104 may cause storage of the pending status for the target user identifier in the user status cache 107 (not shown).

FIG. 4A is a flowchart broadly illustrating operations of process 400 that are executed or performed following process 300 of FIG. 3B-1 to cause rendering of a known user identification interface to the group-based communication interface in response to determining the known status for the target user identifier in accordance with one embodiment of the present disclosure. The depicted process begins at Block 402 following a determination of the known status for the target user identifier in accordance with Block 304 of process 300 as described above.

FIG. 4B is a signal diagram of an example data flow represented by method 400. That is, FIG. 4B illustrates data flow operations of a user identification module of a group-based caching service and a client device when causing rendering of a known user identification interface to the group-based communication interface in response to determining the known status for the target user identifier. Method 400 is described as being performed by a user identification module 116 of a group-based caching service 104 and a client device 108C. In the depicted embodiment, the user identification module 116 of the group-based caching service 104 checks memory of the group-based caching service for a known user identification object associated with the target user identifier at operation 402. In some embodiments, the user identification module 116 of the group-based caching service 104 may check the group-based communication repository 103 of the group-based communication system 102 for a known user identification object associated with the target user identifier as illustrated by optional operation 404. Once a known user identification object is retrieved, it is transmitted to client device 108C at operation 406 to cause rendering of the known user identification interface for the target user identifier within a group-based communication interface as illustrated, for example, in FIGS. 5C-2 and 5C-3 discussed below.

FIG. 5A is a flowchart broadly illustrating operations of process 500 that are executed or performed following process 300 of FIG. 3B-2 to cause rendering of a limited user identification interface to the group-based communication interface in response to determining the unknown status for the target user identifier in accordance with one embodiment of the present disclosure. The depicted process begins at Block 502 following the determination of the unknown status for the target user identifier in accordance with Block 304 of process 300 as described above.

FIG. 5B is a signal diagram of an example data flow represented by method 500. That is, FIG. 5B illustrates data flow operations of a user identification module of a group-based caching service and a client device when causing rendering of a limited user identification interface to the group-based communication interface in response to determining the unknown status for the target user identifier. Method 500 is described as being performed by a user identification module 116 of a group-based caching service 104 and a client device 108C. In the depicted embodiment, the user identification module 116 of the group-based caching service 104 checks a memory of the group-based caching service 104 for a limited user identification object associated with the target user identifier at operation 502. In some embodiments, the user identification module 116 of the group-based caching service 104 may check the group-based communication repository 103 of the group-based communication system 102 for a limited user identification object associated with the target user identifier as illustrated by optional operation 504. Once a limited user identification object is retrieved, it is transmitted to client device 108C at operation 506 to cause rendering of the limited user identification interface for the target user identifier within a group-based communication interface as illustrated, for example, in FIG. 5C.-4 discussed below.

FIGS. 5C-1 through 5C-4 depict example group-based communication interfaces configured in accordance with embodiments of the present disclosure. FIG. 5C-1 depicts an example group-based communication interface 550 configured to facilitate communication and collaboration among users in an externally shared channel, such as for example, the depicted #HR-payroll-issues group-based communication channel 560. The depicted group-based communication interface 550 includes a channel list pane 552 and a messaging pane 554. In the depicted embodiment, group-based communication messages 562, and 564 posted to the #HR-payroll-issues channel are rendered to the messaging pane 554.

In the depicted example, the operating user is named "Kevin Flannery" and the group-based communication interface 550 is rendered from the perspective of this user. In the context of the example discussed above, Kevin Flannery is an employee of Slack Corporation and is associated with client device 108C. Mr. Flannery posted group-based messaging communication 562 to the #HR-payroll-issues group-based communication channel 560 using client device 108C.

A reply group-based communication message 564 was posted by a user named "Jacob Warren" who is associated with client device 108D. As discussed above, client device 108D is associated with a user (i.e., Jacob Warren) employed by ACME Corporation. The depicted group-based communication message 564 includes an @mention of a user (e.g., @jon) associated with client device 108E. In one embodiment of the invention, user engagement (e.g., non-keystroke engagement) by the operating user (i.e., Mr. Flannery) of the header of group-based communication message 564 (i.e., the hyperlink containing name Jacob Warren as shown) triggers the client device 108C to generate a user identification query associated with group-based communication interface 550, wherein user identification query comprises a requesting user identifier associated with Kevin Flannery and a target user identifier associated with Jacob Warren. In another embodiment, as discussed in connection with FIG. 5C-4 below, user engagement (e.g., non-keystroke engagement) by the operating user (i.e., Mr. Flannery) of the @mention of group-based communication message 564 (i.e., the hyperlink containing @jon as shown) triggers the client device 108C to generate a user identification query associated with a group-based communication interface 550, wherein the user identification query comprises a requesting user identifier associated with Kevin Flannery and a target user identifier associated with Jon Kittle (i.e., a user associated with client device 108E).

FIGS. 5C-2 and 5C-3 illustrate example group-based communication interfaces depicting example known user identification interfaces 570, 570' rendered following process 400 of FIG. 4B in accordance with embodiments of the present disclosure. Turning first to the embodiment depicted in FIG. 5C-2, user engagement by the operating user of the hyperlinked name "Jacob Warren" disposed in the header to group-based communication message 564 caused generation of a user identification query that was transmitted by client device 108C to the user identification module of the group-based caching service as discussed in connection with process 300 above. Upon identification of a known status for the target user identifier associated with Jacob Warren from the perspective of the requesting user identifier associated with Mr. Flannery, client device 108C retrieves a known user identification object associated with the target user identifier and displays the depicted known user identification interface 570 to the group-based communication interface 550 as shown.

The depicted known user identification interface 570 is styled in the graphic user interface as a modal or pop-up element and includes a user photo or avatar component 576, a known user profile component 574, and direct communication elements 578. The depicted known user identification interface 570 includes private, sensitive, or internal information drawn from the targeted user's profile in the depicted known user profile component 574 such as office location, supervisor name, direct phone number, and common projects (i.e., projects shared between the targeted user and the operating user). The depicted known user identification interface also includes direct communication elements 578 (i.e., a direct messaging initiating button and a direct call initiating button) that allow an operating user (i.e., Mr. Flannery) to initiate immediate direct communications with the targeted user (i.e., Jacob Warren).

FIG. 5C-3 depicts a known user identification interface 570' of a group-based communication interface 550' structured in accordance with another embodiment of the invention. The depicted group-based communication interface 550' includes a channel list pane 552, a messaging pane 554, and a flex pane 556. The depicted known user identification interface 570' is rendered within flex pane 556 rather than as a modal or pop-up as shown in connection with FIG. 5C-2. The depicted known user identification interface 570' includes a user photo or avatar component 576', a known user profile component 574', and direct communication elements 578'. The depicted known user identification interface 570' includes private, sensitive, or internal information drawn from the targeted user's profile in the depicted known user profile component 574' such as: user short name or handle, title, local time, office location, supervisor name, direct phone number, email address, department, common projects (i.e., projects shared between the targeted user and the operating user), shared workspaces (i.e., workspaces shared between the targeted user and the operating user), and other internal information that will be apparent to one of ordinary skill in the art in view of this disclosure. The depicted known user identification interface also includes direct communication elements 578' (i.e., a direct messaging initiating button and a direct call initiating button) that allow an operating user (i.e., Mr. Flannery) to initiate immediate direct communications with the targeted user (i.e., Jacob Warren).

In some embodiments, known user identification interfaces 570 (shown in FIG. 5C-2) and 570' (shown in FIG. 5C-3) may serve as alternatives to one another. For example, the client device 108C may be configured to display only one or the other to the group-based communication interface. However, in other embodiments, known user identification interface 570 may serve as a primary interface while known user identification interface 570' serves as a secondary interface. For example, an initial operating user engagement of the hyperlinked name "Jacob Warren" disposed in the header to group-based communication message 564 of FIG. 5C-1 may cause the client device 108C to render the modal form of known user identification interface 570. An additional operating user engagement of the avatar component 576 or the known user profile component 574 of the known user identification interfaces 570 may cause the client device 108C to close the known user identification interfaces 570 and render the known user identification interfaces 570' in a flex pane as shown in FIG. 5C-3. In this way, the group-based communication interface is configured to allow an operating user to "drill down" into the known user identification interfaces 570 to obtain more detailed information concerning the targeted user.

Turning to the embodiment depicted in FIG. 5C-4, user engagement by the operating user of the @mention of group-based communication message 564 (i.e., the hyperlink containing @j on as shown) triggers the client device 108C to generate a user identification query that is to the user identification module of the group-based caching service as discussed in connection with process 300 above. Upon identification of an unknown status for the target user identifier associated with Jon Kittle from the perspective of the requesting user identifier associated with Mr. Flannery, client device 108C retrieves a limited user identification object associated with the target user identifier and displays the depicted limited user identification interface 580 to the group-based communication interface 550 as shown.

The depicted limited user identification interface 580 is styled in the graphic user interface as a modal or pop-up element and includes a user photo or avatar component 586 and a limited user message 584. The depicted limited user identification interface 580 excludes private, sensitive, or internal information drawn from the targeted user's profile. Instead, the depicted limited user identification interface 580 includes a limited user message 584 that notifies the operating user (i.e., Mr. Flannery) that the targeted user (i.e., Mr. Kittle) has not been validated for direct communication and/or information sharing. Notably, the depicted limited user identification interface also does not include direct communication elements as discussed above in connection with FIGS. 5C-2 and 5C-3.

FIG. 6A is a flowchart broadly illustrating operations of process 600 that are executed or performed following process 300 of FIG. 3B-3 to cause transmission of a client device hold instruction in response to determining the pending status for the target user identifier in accordance with one embodiment of the present disclosure. The depicted process begins at Block 602 following a determination of the pending status for the target user identifier in accordance with Block 304 of process 300 as described above.

FIG. 6B is a signal diagram of an example data flow represented by method 600. That is, FIG. 6B illustrates data flow operations of a user identification module of a group-based caching service and a client device when causing transmission of a client device hold instruction in response to determining the pending status for the target user identifier. Method 600 is described as being performed by a user identification module 116 of a group-based caching service 104 and a client device 108C. In the depicted embodiment, the user identification module 116 of the group-based caching service 104 checks the user status cache 107 for either a known system status associated with the target user identifier or an unknown system status associated with the target user identifier at operation 602.

Upon a determination that neither a known system status designation or an unknown system status designation associated with the target user identifier is stored in user status cache, the user identification module of group-based caching service determines a pending status for the target user identifier at operation 610. In other embodiments, a pending status for the target user identifier may have previously been stored to the user status cache and thus the user identification module need not make any new status determination but rather simply return the previously stored pending status designation. A client device hold instruction is transmitted, at operation 604, to client device 108C by the user identification module 116 of the group-based caching service 104. The client device hold instructions causes the client device 108C to forgo further target user identifier associated queries of the group-based caching service or the group-based communication server for at least a hold period or until the communication apparatus (e.g., the user identification module of the group-based caching service) can return one of a resolved known status or a resolved unknown status for the target user identifier to client device 108C as discussed below.

FIG. 7A is a flowchart broadly illustrating operations of process 700 that are executed or performed following process 300 of FIG. 3B-3 to cause comparison of the target user identifier to a group connection array associated with the requesting user identifier to determine a resolved known status or a resolved unknown status in response to determining the pending status for the target user identifier in accordance with one embodiment of the present disclosure. The depicted process begins at Block 702 following a determination of the pending status for the target user identifier in accordance with Block 304 of process 300 as described above. In some embodiments, the depicted process begins at Block 702 immediately following transmission of a client hold instructions transmission sent in accordance with Block 602 of FIG. 6A. The depicted process 700 concludes at Block 704 causing updating of the user status cache associated with the requesting user identifier to replace the pending status for the target user identifier with the determined resolved known or the resolved unknown status.

FIGS. 7B-1 through 7B-2 are signal diagrams of example data flows represented by method 700. That is, FIGS. 7B-1 through 7B-2 illustrate data flow operations of a user identification module of a group-based caching service and a group connection array of a group-based communication system when causing comparison of the target user identifier to the group connection array associated with the requesting user identifier to determine a resolved known status in response to determining the pending status for the target user identifier.

In the depicted example of FIG. 7B-1, method 700 is described as being performed by a user identification module 116 of a group-based caching service 104 and a group connection array 105 of a group-based communication system 102. In the depicted embodiment, the user identification module 116 of the depicted group-based caching service 104 has determined a pending status for the user identifier associated with the tagged coworker associated with client device 108F in accordance with Block 304 of process 300 as described above. The user identification module 116 of the group-based caching service 104 causes comparison of the target user identifier (i.e., the user identifier associated with the tagged coworker associated with client device 108F) to a group connection array 105 associated with the requesting user identifier (i.e., the user identifier associated with client device 108C) at operation 704. In this example, the operating user associated with client device 108C had sufficient links, connections, and/or associations to the target user associated with client device 108F stored within the group connection array (e.g., a known threshold is satisfied) for the user identification module to designate a resolved known status for the target user identifier at operation 706. This resolved known status is then stored to the user status cache replacing the prior pending status at operation 720.

In the depicted example of FIG. 7B-2, method 700 is described as being performed by a user identification module 116 of a group-based caching service 104 and a group connection array 105 of a group-based communication system 102. The user identification module 116 of the group-based caching service 104 has determined a pending status for the user identifier associated with the tagged coworker associated with client device 108F in accordance with Block 304 of process 300 as described above. The user identification module 116 of the group-based caching service 104 causes comparison of the target user identifier (i.e., the user identifier associated with the tagged coworker associated with client device 108F) to a group connection array 105 associated with the requesting user identifier (i.e., the user identifier associated with client device 108C) at operation 704. However, in this example, the operating user associated with client device 108C does not have sufficient links, connections, and/or associations to the target user associated with client device 108F stored within the group connection array (e.g., a known threshold is not satisfied) for the user identification module to designate a resolved known status for the target user identifier. Thus, the user identification module designates a resolved unknown status at operation 708. This resolved unknown status is then stored to the user status cache replacing the prior pending status at operation 725.

FIG. 8A is a flowchart broadly illustrating operations of process 800 that are executed or performed following process 700 of FIG. 7B-1 to cause rendering of a known user identification interface to the group-based communication interface in response to determining the resolved known status for the target user identifier in accordance with one embodiment of the present disclosure. The depicted process begins at Block 802 following a determination of the resolved known status for the target user identifier in accordance with Block 702 of process 700 as described above.

FIG. 8B is a signal diagram of an example data flow represented by method 800. That is, FIG. 8B illustrates data flow operations of a user identification module of a group-based caching service and a client device when causing rendering of a known user identification interface to the group-based communication interface in response to determining the resolved known status for the target user identifier. Method 800 is described as being performed by a user identification module 116 of a group-based caching service 104 and client device 108C. In the depicted embodiment, the user identification module 116 of the group-based caching service 104 checks memory of the group-based caching service for a known user identification object associated with the target user identifier at operation 802. In some embodiments, the user identification module 116 of the group-based caching service 104 may check the group-based communication repository 103 of the group-based communication system 102 for a known user identification object associated with the target user identifier as illustrated by optional operation 804. Once a known user identification object is retrieved, it is transmitted to client device 108C at operation 806 to cause rendering of the known user identification interface within a group-based communication interface.

FIG. 9A is a flowchart broadly illustrating operations of process 900 that are executed or performed following process 700 of FIG. 7B-2 to cause rendering of a limited user identification interface to the group-based communication interface in response to determining the resolved unknown status for the target user identifier in accordance with one embodiment of the present disclosure. The depicted process begins at Block 902 following a determination of the resolved unknown status for the target user identifier in accordance with Block 702 of process 700 as described above.

FIG. 9B is a signal diagram of an example data flow represented by method 900. That is, FIG. 9B illustrates data flow operations of a user identification module of a group-based caching service and a client device when causing rendering of a limited user identification interface to the group-based communication interface in response to determining the resolved unknown status for the target user identifier. Method 900 is described as being performed by a user identification module 116 of a group-based caching service 104 and client device 108C. In the depicted embodiment, the user identification module 116 of the group-based caching service 104 checks a memory of the group-based caching service for a limited user identification object associated with the target user identifier at operation 902. In some embodiments, the user identification module 116 of the group-based caching service 104 may check the group-based communication repository 103 of the group-based communication system 102 for a limited user identification object associated with the target user identifier as illustrated by optional operation 904. Once a limited user identification object is retrieved, it is transmitted to client device 108C at operation 906 to cause rendering of the limited user identification interface within a group-based communication interface.

FIG. 10A is a flowchart broadly illustrating operations or process blocks of process 1000 that are executed or performed following operations 604 of FIG. 6B and 708 of FIG. 7B-2. Process 1000 is executed or performed to cause retrieval of a limited user identification object associated with the target user identifier from a group-based repository in response to determining the resolved unknown status for the target user identifier. Process 1000 follows transmission of a client hold instruction and includes transmission of the limited user identification object to the client device for rendering, via a display of the client device, the limited user identification interface to the group-based communication interface based on the limited user identification object in accordance with one embodiment of the present disclosure.

The depicted process begins at Block 1004 following transmission of the client hold instruction in accordance with Block 602 and in response to determining the resolved unknown status for the target user identifier in accordance with Block 702 of process 700 as described above. Block 1004 includes causing retrieval of a limited user identification object associated with the target user identifier from the group-based communication repository of the group-based communication system.

At Block 1006, the depicted process 1000 further includes transmitting the limited user identification object to the client device for rendering, via a display of the client device, the limited user identification interface to the group-based communication interface based on the limited user identification object.

FIG. 10B is a signal diagram of an example data flow represented by method 1000. That is, FIG. 10B illustrates data flow interactions between a client device, a user identification module of a group-based caching service, and a group-based communication repository of a group-based communication system. In the depicted embodiment, method 1000 is described as being performed by a client device 108C, a user identification module 116 of a group-based caching service 104, and a group-based communication repository 103. The user identification module 116 of the group-based caching service 104 checks the group-based communication repository 103 of the group-based communication system 102 for a limited user identification object associated with the target user identifier as illustrated by operation 1104. Once a limited user identification object is retrieved by the user identification module 116 of the group-based caching service 104 from the group-based communication repository 103 of the group-based communication system 102, it is transmitted by the user identification module 116 of the group-based caching service 104 to client device 108C at operation 1006 to cause rendering of the known user identification interface within a group-based communication interface.

FIG. 11A is a flowchart broadly illustrating operations or process blocks of process 1100 that are executed or performed following process 310 of FIG. 3B-3 to cause transmission of a client device hold instruction to a client device, receive a second user identification query associated with the group-based communication interface, cause transmission of a second client device hold instruction to a second client device associated with the second requesting user identifier, and cause comparison of the target user identifier to a group connection array associated with the requesting user identifier to determine a resolved known status or a resolved unknown status for the target user identifier in accordance with a preferred embodiment of the present disclosure. Thus, process 1100 describes managing multiple user identification requests from multiple requesting users for the same target user as explained in detail below.

In the embodiment illustrated in FIG. 11A, the depicted process begins at Block 1102 which includes causing transmission of a client device hold instruction to a client device associated with the requesting user identifier in response to determining the pending status for the target user identifier in accordance with Block 304 of process 300 illustrated in FIG. 3A above.

At Block 1104, the depicted process 1100 further includes retrieving a second user identification query associated with the group-based communication interface, the second user identification query comprising a second requesting user identifier and the target user identifier. For example, if we return to the example discussed above in which the user associated with client device 108D tags a coworker associated with client device 108F to a message posted to the #HR-payroll-issues group-based communication channel shared with the user associated with client device 108C, we recall that the user identification module determined a pending status associated with user identifier associated with client device 108D and issued a client device hold instruction to client device 108C. The process of Block 1104 occurs in circumstances where a second client device, e.g., client device 108A, transmits a second user identification query to the user identification module of the group-based caching service. In this example, the second user identification query comprises a requesting user identifier associated with the operating user of client device 108A and the target user identifier associated with the user of client device 108F.

At Block 1106, the depicted process 1100 further includes causing transmission of a second client device hold instruction to a second client device associated with the second requesting user identifier. In the present example, that involves transmitting a second client device hold instruction to client device 108A.

At Block 1108, the depicted process 1100 further includes causing comparison of the target user identifier to a group connection array associated with the requesting user identifier to determine a resolved known status or a resolved unknown status for the target user identifier.

FIGS. 11B-1 through 11B-2 are example signal diagrams illustrating data flow operations represented by process 1100. That is, FIGS. 11B-1 through 11B-2 illustrate data flow interactions of a client device, a second client device, a user identification module of a group-based caching service, and a group connection array of a group-based communication system when: causing transmission of a client device hold instruction to a client device, receiving a second user identification query associated with the group-based communication interface, causing transmission of a second client device hold instruction to a second client device associated with the second requesting user identifier, and causing comparison of the target user identifier to a group connection array associated with the requesting user identifier to determine a resolved known status for the target user identifier in accordance with a preferred embodiment.

In the depicted example of FIG. 11B-1, method 1100 is described as being performed by a client device 108C, a second client device 108A, a user identification module 116 of a group-based caching service 104, and a group connection array 105 of a group-based communication system 102. The user identification module 116 of the depicted group-based caching service 104 retrieves or receives a user identification query from client device 108C. In the depicted example, client device 108F is associated with the target user identifier of the user identification query issued from client device 108C. As discussed above, the user identification module 116 of the group-based caching service 104 determined a pending status for the target user operating client device 108F. Thus, at operation 1102, the user identification module 116 of the group-based caching service 104 causes transmission of a client device hold instruction to client device 108C for a hold period or at least until resolution of the pending status (i.e., until a resolved known or a resolved unknown status is determined).

While the pending status of the user identification query received by the user identification module 116 of the group-based caching service 104 from client device 108C remains unresolved, a second user identification query from a second client device (client device 108A) is received by the user identification module 116 of the group-based caching service at operation 1104. The second user identification query comprises a second requesting user identifier (e.g., a user identifier associated with an operating user of client device 108A) and the target user identifier associated with the operating user of client device 108F.

It is desirable to avoid computational stress on the group-based communication server and, to a lesser extent, on the group-based caching service. In large group-based communication channels having hundreds or thousands of members, a risk exists that mentioning a single external user (i.e., an external targeted user identifier) might cause hundreds or thousands of client devices to continuously query the group-based communication server or the group-based caching service if one did not implement one or more of the embodiments discussed herein. This could cause unexpected network resource strain and or unplanned system outages. It also might present a latent DDOS vulnerability as discussed above.

Various embodiments of the present invention serve to conserve computational resources and to mitigate DDOS vulnerability by limiting bombardment of the group-based communication server by unplanned waves of user identification queries. Therefore, at operation 1106, the user identification module 116 of the group-based caching service 104 causes transmission of a second client device hold instruction to the second client device 108A associated with the second requesting user identifier.

The user identification module 116 of the group-based caching service 104 may resolve the pending user identification queries by causing comparison of the target user identifier to group connection arrays associated with each respective requesting user identifier at operation 1108. For example, the user identification module 116 of the group-based caching service 104 may cause comparison of the target user identifier associated with client device 108F to a group connection array associated with the requesting user identifier associated with client device 108C. Likewise, the user identification module 116 of the group-based caching service 104 may cause comparison of the target user identifier associated with client device 108F to a group connection array associated with the requesting user identifier associated with client device 108A.

In this example, the operating user associated with client device 108C and the operating user associated with client device 108A each had sufficient links, connections, and/or associations to the target user associated with client device 108F stored within the group connection array (e.g., a known threshold is satisfied) for the user identification module to designate a resolved known status for the target user identifier at operation 1110 relative to both requesting identifiers. This resolved known status is then stored to the user status cache replacing the prior pending status at operation 1120.

As depicted in FIG. 1, client devices 108C and 108D are associated with users who have both been validated by the group-based communication system for membership in the #HR-payroll-issues group-based communication channel. Further, as depicted in FIG. 1, client devices 108D and 108E are associated with users from Organization B (e.g., ACME Corporation). Therefore, both user identification queries should be determined to have a known status upon comparison of the target user identifier to the respective group connection arrays. Process 1200 may thus conclude at operation 1210 with a determination by the user identification module 116 of the group-based caching service 104 of a resolved known status for the target user identifier associated with client device 108D.

In the depicted example of FIG. 11B-2, method 1100 is described as being performed by a client device 108C, a second client device 108B, a user identification module 116 of a group-based caching service 104, and a group connection array 105 of the group-based communication system 102. In the depicted example, the operating user associated with client device 108F is the target user of the user identification queries from client devices 108C and 108B. The user identification module 116 of the depicted group-based caching service 104 has retrieved or received a user identification query from client device 108C. In the depicted embodiment, the user identification module 116 of the group-based caching service 104 determined a pending status for the target user identifier associated with client device 108F. Thus, at operation 1102, the user identification module 116 of the group-based caching service 104 causes transmission of a client device hold instruction to client device 108C until resolution of the pending status.

While the pending status of the user identification query retrieved by the user identification module 116 of the group-based caching service 104 from client device 108C remains unresolved, a second user identification query from a second client device (client device 108B) is received by the user identification module 116 of the group-based caching service at operation 1104. The second user identification query comprises a second requesting user identifier (e.g., a user identifier associated with an operating user of client device 108A) and the target user identifier associated with the operating user of client device 108F.

In the depicted embodiment, the user identification module 116 of the group-based caching service 104 causes transmission at operation 1106 of a second client device hold instruction to the second client device 108B associated with the second requesting user identifier.

The user identification module 116 of the group-based caching service 104 resolves the pending status associated with the received user identification queries by causing comparison of the target user identifier from such queries to a group connection array associated with each respective requesting user identifier at operation 1108. For example, the user identification module 116 of the group-based caching service 104 may cause comparison of the target user identifier associated with client device 108F to a group connection array associated with the requesting user identifier associated with client device 108C. Likewise, the user identification module 116 of the group-based caching service 104 may cause comparison of the target user identifier associated with client device 108F to a group connection array associated with the requesting user identifier associated with client device 108B. In some embodiments, as will be apparent to one of ordinary skill in the art, a group connection array may be embodied as a single database or repository that contains multiple requesting user identifiers mapped to each target user identifier (i.e., a many to one database structure).

In this example, the operating user associated with client device 108C and the operating user associated with client device 108B each fail to have sufficient links, connections, and/or associations to the target user associated with client device 108F stored within the group connection array (e.g., a known threshold is not satisfied) and thus the user identification module designates a resolved unknown status for the target user identifier at operation 1112 relative to both requesting identifiers. This resolved unknown status is then stored to the user status cache replacing the prior pending status at operation 1125.

FIG. 12A is a flowchart broadly illustrating operations of process 1200 that are executed or performed following process 1100 of FIG. 11B-2 to cause retrieval of a limited user identification object associated with the target user identifier from a group-based communication repository in response to determining the resolved unknown status for the target user identifier, and transmitting the limited user identification object to the client device and to the second client device for rendering the limited user identification interface to the group-based communication interface based on the limited user identification object. The depicted process begins at Block 1202 by retrieving a limited user identification object associated with the target user identifier from the group-based communication repository following a determination of the resolved unknown status for the target user identifier in accordance with Block 1108 of process 1100 as described above.

At Block 1204, the depicted process 1200 further includes transmitting the limited user identification object to the client device and to the second client device for rendering, via displays of the client device and the second client device, the limited user identification interface to the group-based communication interface based on the limited user identification object.

FIG. 12B is signal diagram of an example data flow represented by method 1200. That is, FIG. 12B illustrates data flow operations of a client device, a second client device, a user identification module of a group-based caching service, and a group-based communication repository of a group-based communication system. More specifically, method 1200 is described in FIG. 12B as being performed by a client device 108C, a second client device 108B, a user identification module 116 of a group-based caching service 104, and a group-based communication repository 103 of a group-based communication system 102 as shown in FIG. 1. In the depicted embodiment, the user identification module 116 of the group-based caching service 104 checks the group-based communication repository 103 at operation 1202 for a limited user identification object associated with the target user identifier (i.e., the user identifier associated with the user operating client device 108F). At operation 1204 of the depicted embodiment, the user identification module 116 of the group-based caching service 104 retrieves the limited user identification object associated with the target user identifier.

The limited user identification object comprises the requisite data and instructions for rendering a limited user identification interface for the target user identifier. Method 1200 concludes at operation 1306 with the user identification module 116 of the group-based caching service 104 transmitting the limited user identification object associated with the user operating client device 108F to client device 108C (depicted as operation 1206A) and to second client device 108B (depicted as operation 1206B) for rendering of a limited user identification interfaces for the target user identifier (i.e., the user operating client device 108F) to group-based communication interfaces rendered to displays of client device 108C and 108B respectively.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A communication apparatus configured to manage user identification queries, the communication apparatus comprising at least one processor and at least one memory, the at least one memory having computer-coded instructions therein, wherein the computer-coded instructions are configured to, in execution with the at least one processor, cause the communication apparatus to:
   retrieve a user identification query associated with a group-based communication interface, the user identification query comprising a requesting user identifier and a target user identifier;
   compare the target user identifier to a user status cache associated with the requesting user identifier to determine one of a known status, an unknown status, or a pending status for the target user identifier;
   cause rendering of a known user identification interface to the group-based communication interface in response to determining the known status for the target user identifier; and
   cause rendering of a limited user identification interface to the group-based communication interface in response to determining the unknown status for the target user identifier.

2. The communication apparatus of claim 1, wherein the computer-coded instructions are further configured to cause the apparatus to:
   transmit a client device hold instruction in response to determining the pending status for the target user identifier.

3. The communication apparatus of claim 1, wherein the computer-coded instructions are further configured to cause the apparatus to:
   compare the target user identifier to a group connection array associated with the requesting user identifier to determine a resolved known status or a resolved unknown status in response to determining the pending status for the target user identifier.

4. The communication apparatus of claim 3, wherein the computer-coded instructions are further configured to cause the apparatus to:
   update the user status cache associated with the requesting user identifier to replace the pending status for the target user identifier with the determined resolved known status or the resolved unknown status.

5. The communication apparatus of claim 3, wherein the computer-coded instructions are further configured to cause the apparatus to:
   cause rendering of the known user identification interface to the group-based communication interface in response to determining the resolved known status for the target user identifier; and
cause rendering of the limited user identification interface to the group-based communication interface in response to determining the resolved unknown status for the target user identifier.

6. The communication apparatus of claim 1, wherein the computer-coded instructions are further configured to cause the apparatus to:
retrieve a limited user identification object associated with the target user identifier from a group-based communication repository in response to determining the unknown status for the target user identifier; and
cause rendering of the limited user identification interface to the group-based communication interface based on the limited user identification object.

7. The communication apparatus of claim 1, wherein the computer-coded instructions are further configured to cause the apparatus to:
retrieve a limited user identification object associated with the target user identifier from a group-based communication repository in response to determining the unknown status for the target user identifier; and
transmit the limited user identification object to a client device for rendering, via a display of the client device, the limited user identification interface to the group-based communication interface based on the limited user identification object.

8. The communication apparatus of claim 1, wherein the computer-coded instructions are further configured to cause the apparatus to:
transmit a client device hold instruction to a client device associated with user identification query in response to determining the pending status for the target user identifier;
compare the target user identifier to a group connection array associated with the requesting user identifier to determine a resolved known status or a resolved unknown status in response to determining the pending status for the target user identifier;
retrieve a limited user identification object associated with the target user identifier from a group-based communication repository in response to determining the resolved unknown status for the target user identifier and following transmission of the client device hold instruction; and
transmit the limited user identification object to the client device for rendering, via a display of the client device, the limited user identification interface to the group-based communication interface based on the limited user identification object.

9. The communication apparatus of claim 1, wherein the computer-coded instructions are further configured to cause the apparatus to:
transmit a first client device hold instruction to a first client device associated with the requesting user identifier in response to determining the pending status for the target user identifier;
retrieve a second user identification query associated with the group-based communication interface, the second user identification query comprising a second requesting user identifier and the target user identifier;
transmit a second client device hold instruction to a second client device associated with the second requesting user identifier;
compare the target user identifier to a group connection array associated with the requesting user identifier to determine a resolved known status or a resolved unknown status for the target user identifier;
retrieve a limited user identification object associated with the target user identifier from a group-based communication repository in response to determining the resolved unknown status for the target user identifier; and
transmit the limited user identification object to the first client device and to the second client device for rendering, via displays of the first client device and the second client device, the limited user identification interface to the group-based communication interface based on the limited user identification object.

10. The communication apparatus of claim 9, wherein the computer-coded instructions are further configured to cause the apparatus to:
update the user status cache to replace the pending status for the target user identifier with the determined resolved known status or the resolved unknown status.

11. A computer implemented method for managing user identification queries, the method comprising:
retrieving a user identification query associated with a group-based communication interface, the user identification query comprising a requesting user identifier and a target user identifier; and
comparing the target user identifier to a user status cache associated with the requesting user identifier to determine one of a known status, an unknown status, or a pending status for the target user identifier.

12. The computer implemented method of claim 11, further comprising:
causing rendering of a known user identification interface to the group-based communication interface in response to determining the known status for the target user identifier.

13. The computer implemented method of claim 11, further comprising:
causing rendering of a limited user identification interface to the group-based communication interface in response to determining the unknown status for the target user identifier.

14. The computer implemented method of claim 11, further comprising:
transmitting a client device hold instruction in response to determining the pending status for the target user identifier.

15. The computer implemented method of claim 14, further comprising:
comparing the target user identifier to a group connection array associated with the requesting user identifier to determine a resolved known status or a resolved unknown status in response to determining the pending status for the target user identifier.

16. The computer implemented method of claim 15, further comprising:
updating the user status cache associated with the requesting user identifier to replace the pending status for the target user identifier with the determined resolved known status or the resolved unknown status.

17. The computer implemented method of claim 15, further comprising:
rendering a known user identification interface to the group-based communication interface in response to determining the resolved known status for the target user identifier.

18. The computer implemented method of claim 15, further comprising:
  rendering a limited user identification interface to the group-based communication interface in response to determining the resolved unknown status for the target user identifier.

19. The computer implemented method of claim 15, further comprising:
  retrieving a limited user identification object associated with the target user identifier from a group-based communication repository in response to determining the resolved unknown status for the target user identifier and following transmission of a client device hold instruction; and
  transmitting the limited user identification object to a client device for rendering, via a display of the client device, a limited user identification interface to the group-based communication interface based on the limited user identification object.

20. The computer implemented method of claim 11, further comprising:
  transmitting a client device hold instruction to a first client device associated with the requesting user identifier in response to determining the pending status for the target user identifier;
  retrieving a second user identification query associated with the group-based communication interface, the second user identification query comprising a second requesting user identifier and the target user identifier;
  transmitting a second client device hold instruction to a second client device associated with the second requesting user identifier; and
  comparing the target user identifier to a group connection array associated with the requesting user identifier to determine a resolved known status or a resolved unknown status for the target user identifier.

21. The computer implemented method of claim 20, further comprising:
  retrieving a limited user identification object associated with the target user identifier from a group-based communication repository in response to determining the resolved unknown status for the target user identifier; and
  transmitting the limited user identification object to the first client device and to the second client device for rendering, via displays of the first client device and the second client device, a limited user identification interface to the group-based communication interface based on the limited user identification object.

22. The computer implemented method of claim 20, further comprising:
  causing rendering, via displays of the first client device and the second client device, of a limited user identification interface to the group-based communication interface in response to determining the resolved unknown status for the target user identifier.

23. The computer implemented method of claim 20, further comprising:
  updating the user status cache to replace the pending status for the target user identifier with the determined resolved known status or the resolved unknown status.

* * * * *